US009793527B2

(12) United States Patent
Kaneda

(10) Patent No.: US 9,793,527 B2
(45) Date of Patent: Oct. 17, 2017

(54) NEGATIVE ELECTRODE FOR SECONDARY BATTERIES AND METHOD FOR PRODUCING SAME

(71) Applicant: ZEON CORPORATION, Tokyo (JP)

(72) Inventor: Takuya Kaneda, Tokyo (JP)

(73) Assignee: ZEON CORPORATION, Tokyo (JP)

(*) Notice: Subject to any disclaimer, the term of this patent is extended or adjusted under 35 U.S.C. 154(b) by 411 days.

(21) Appl. No.: 14/400,932

(22) PCT Filed: May 29, 2013

(86) PCT No.: PCT/JP2013/064892
§ 371 (c)(1),
(2) Date: Nov. 13, 2014

(87) PCT Pub. No.: WO2013/180168
PCT Pub. Date: Dec. 5, 2013

(65) Prior Publication Data
US 2015/0125745 A1 May 7, 2015

(30) Foreign Application Priority Data
May 30, 2012 (JP) ................................ 2012-123262

(51) Int. Cl.
*H01M 4/13* (2010.01)
*H01M 2/16* (2006.01)
*H01M 4/36* (2006.01)
*H01M 10/42* (2006.01)
*H01M 4/139* (2010.01)
*H01M 2/14* (2006.01)
*H01M 4/62* (2006.01)
*H01M 4/80* (2006.01)
*H01M 10/052* (2010.01)
*H01M 4/02* (2006.01)

(52) U.S. Cl.
CPC ......... *H01M 2/1673* (2013.01); *H01M 2/145* (2013.01); *H01M 2/1653* (2013.01); *H01M 4/13* (2013.01); *H01M 4/139* (2013.01); *H01M 4/366* (2013.01); *H01M 10/4235* (2013.01); *H01M 4/62* (2013.01); *H01M 4/80* (2013.01); *H01M 10/052* (2013.01); *H01M 2004/027* (2013.01)

(58) Field of Classification Search
CPC ........... H01M 10/052; H01M 10/4235; H01M 2004/027; H01M 2/145; H01M 2/1653; H01M 2/1673; H01M 4/13; H01M 4/139; H01M 4/366; H01M 4/62; H01M 4/80; Y02E 60/122; Y02P 70/54
See application file for complete search history.

(56) References Cited

U.S. PATENT DOCUMENTS

| | | |
|---|---|---|
| 2009/0024488 A1 | 1/2009 | Romley |
| 2010/0248026 A1 | 9/2010 | Hinoki et al. |
| 2011/0318630 A1 | 12/2011 | Wakizaka et al. |
| 2013/0130123 A1 | 5/2013 | Kaneda et al. |
| 2013/0266873 A1 | 10/2013 | Ishii et al. |
| 2013/0273421 A1 | 10/2013 | Matsumura et al. |
| 2014/0141314 A1 | 5/2014 | Kaneda |

FOREIGN PATENT DOCUMENTS

| | | |
|---|---|---|
| JP | 2010-0225544 A | 10/2010 |
| WO | 2009/012316 A1 | 1/2009 |
| WO | 2010/074202 A1 | 7/2010 |
| WO | 2012/011555 A1 | 1/2012 |
| WO | 2012/020737 A1 | 2/2012 |
| WO | 2012/046843 A1 | 4/2012 |
| WO | 2012/057324 A1 | 5/2012 |
| WO | 2013/005683 A1 | 1/2013 |

OTHER PUBLICATIONS

International Search Report; PCT/JP2013/064892; Jun. 25, 2013.
The extended European search report issued by the European Patent Office on Feb. 4, 2016, which corresponds to European Patent Application No. 13796433.4-1373 and is related to U.S. Appl. No. 14/400,932.
First Office Action issued by the State Intellectual Property Office of People's Republic of China on Feb. 26, 2016, which corresponds to Chinese Patent Application No. 201380025686.3 and is related to U.S. Appl. No. 14/400,932; with English language translation.

*Primary Examiner* — Basia Ridley
*Assistant Examiner* — Heng Chan
(74) *Attorney, Agent, or Firm* — Studebaker & Brackett PC

(57) ABSTRACT

A secondary battery negative electrode including a current collector, a negative electrode active material layer, and a porous membrane, wherein the negative electrode active material layer contains a negative electrode active material and a particulate negative electrode polymer, the porous membrane contains non-conductive particles and a porous membrane polymer that is a non-particulate cross-linked polymer, and the non-conductive particles are particles of a polymer that contains 50% by weight or more of a structural unit formed by polymerization of a (meth)acrylate, the polymer having a softening starting point or decomposition point of 175° C. or higher.

10 Claims, No Drawings

NEGATIVE ELECTRODE FOR SECONDARY BATTERIES AND METHOD FOR PRODUCING SAME

FIELD

The present invention relates to a secondary battery negative electrode and to a method for producing the same.

BACKGROUND

For improving safety and battery property of secondary batteries, there has been proposed a technique of using non-conductive inorganic particles such as alumina particles to form a porous membrane on a surface of an electrode active material layer of an electrode (see Patent Literature 1). However, in the porous membrane using the non-conductive inorganic particles, it is concerned that the battery property may deteriorate due to dissolution of metal. In order to solve this problem, there has been proposed a porous membrane using non-conductive particles formed from a polymer (see Patent Literatures 2 and 3).

CITATION LIST

Patent Literature

Patent Literature 1: International Publication No. 2009/12316
Patent Literature 2: Japanese Patent Application Laid-Open No. 2010-225544 A
Patent Literature 3: International Publication No. 2012/20737

SUMMARY

Technical Problem

When the non-conductive particles are detached from the porous membrane or the porous membrane is peeled off the negative electrode active material layer, the possibility of the occurrence of a short circuit increases. Therefore, it is preferable to prevent detachment of the non-conductive particles from the porous membrane and peeling of the porous membrane off the negative electrode active material layer. It is thus desirable for the porous membrane to further improve the binding property between the non-conductive particles and the negative electrode active material layer, and the binding property between the non-conductive particles themselves to thereby increase the reliability of the secondary battery.

In recent years, from the viewpoint of increasing the capacity of secondary batteries, it is contemplated to use a compound containing silicon as the negative electrode active material. However, in the negative electrode active material including the compound containing silicon, the degree of expansion and contraction due to charging and discharging is larger than that in conventional carbon-based active materials. When the negative electrode active material layer is expanded by repeated expansion and contraction of the negative electrode active material, a conductive path in the negative electrode is disconnected. Therefore, when a secondary battery has a negative electrode active material having high degree of expansion and contraction due to charging and discharging, the secondary battery tends to have poor cycle property. Accordingly, there is a need for a technique for improving the cycle property of secondary batteries as well.

The present invention has been created in view of the foregoing problems, and it is an object to provide a secondary battery negative electrode that can realize a highly reliable secondary battery having excellent cycle property and to provide a method for producing the secondary battery negative electrode.

Solution to Problem

The present inventor has conducted extensive studies to solve the aforementioned problems and found out that a highly reliable secondary battery having excellent cycle property can be realized by using a particular negative electrode, and thus the present invention has been completed. The particular negative electrode is the one which includes a current collector, a negative electrode active material layer, and a porous membrane, wherein the negative electrode active material layer contains a negative electrode active material and a particulate negative electrode polymer, and wherein the porous membrane contains non-conductive particles and a non-particulate cross-linked porous membrane polymer, and particles of a (meth)acrylate polymer with a softening starting point or a decomposition point equal to or higher than a specific temperature are used as the non-conductive particles.

Accordingly, the present invention is as follows.

(1) A secondary battery negative electrode comprising a current collector, a negative electrode active material layer, and a porous membrane, wherein the negative electrode active material layer contains a negative electrode active material and a particulate negative electrode polymer, the porous membrane contains non-conductive particles and a porous membrane polymer that is a non-particulate cross-linked polymer, and the non-conductive particles are particles of a polymer that contains 50% by weight or more of a structural unit formed by polymerization of a (meth)acrylate, the polymer having a softening starting point or decomposition point of 175° C. or higher.

(2) The secondary battery negative electrode according to (1), wherein the porous membrane polymer includes a cross-linked structure formed by one or more types of groups selected from the group consisting of an epoxy group, a carboxyl group, and a sulfo group.

(3) The secondary battery negative electrode according to (1) or (2), wherein a number average particle diameter of the non-conductive particles is 100 nm to 2,000 nm, and a variation coefficient in diameter of the non-conductive particles is 26% or less.

(4) The secondary battery negative electrode according to any one of (1) to (3), wherein the negative electrode active material is a composite particle containing a material including silicon.

(5) A method for producing a secondary battery negative electrode including a current collector, a negative electrode active material layer, and a porous membrane, the method comprising:

applying a negative electrode slurry containing the negative electrode active material, a particulate negative electrode polymer, and water onto the current collector and then drying the negative electrode slurry to thereby obtain the negative electrode active material layer;

applying a porous membrane slurry onto the negative electrode active material layer and drying the applied porous membrane slurry, the porous membrane slurry containing: non-conductive particles that are particles of a polymer that includes 50% by weight or more of a structural unit formed by polymerization of a (meth)acrylate and has a softening starting point or decomposition point of 175° C. or higher; a porous membrane polymer that is a non-particulate cross-linkable polymer; and a solvent; and cross-linking the porous membrane polymer by heating.
(6) The method for producing a secondary battery negative electrode according to (5), wherein the porous membrane slurry contains two or more types of solvents, and the difference in boiling point between the two or more types of solvents is 40° C. or more.

Advantageous Effects of Invention

According to the secondary battery negative electrode of the present invention, a highly reliable secondary battery having excellent cycle property can be realized.

According to the method for producing a secondary battery negative electrode of the present invention, a negative electrode which can realize a highly reliable secondary battery having excellent cycle property can be produced.

DESCRIPTION OF EMBODIMENTS

The present invention will be described in detail by way of embodiments and exemplifications. However, the present invention is not limited to the following embodiments and exemplifications and may be embodied with any modifications without departing from the scope of the claims and equivalents thereto.

In the following description, (meth)acrylic acid is meant to include acrylic acid and methacrylic acid. (Meth)acrylate is meant to include acrylate and methacrylate. (Meth)acrylonitrile is meant to include acrylonitrile and methacrylonitrile.

That a material is water-soluble means that, when 0.5 g of the material is dissolved in 100 g of water at 25° C., the amount of the undissolved portion of the material is less than 0.5% by weight. That a material is water-insoluble means that, when 0.5 g of the material is dissolved in 100 g of water at 25° C., the amount of the undissolved portion of the material is 90% by weight or more.

[1. Summary of Negative Electrode]

The secondary battery negative electrode of the present invention (this may be appropriately referred to hereinbelow as a "negative electrode") includes a current collector, a negative electrode active material layer, and a porous membrane. Usually, the negative electrode active material layer is provided on the current collector, and the porous membrane is provided on the negative electrode active material.

[2. Current Collector]

As the current collector, a material having electric conductivity and electrochemical durability is usually used. Particularly, from the viewpoint of having heat resistance, a metal material such as iron, copper, aluminum, nickel, stainless steel, titanium, tantalum, gold, and platinum is preferred. Of these, copper is particularly preferred for the negative electrode.

No particular limitation is imposed on the shape of the current collector, but a sheet shaped current collector having a thickness of 0.001 mm to 0.5 mm is preferred.

Preferably, the current collector is previously subjected to roughing treatment for improving the binding strength to the negative electrode active material layer. Examples of the roughening method may include a mechanical polishing method, an electrochemical polishing method, and a chemical polishing method. In the mechanical polishing method, e.g., polishing cloth or paper to which polishing particles adhere, a grindstone, an emery wheel, a wire brush provided with steel wires, etc. is used.

For improving conductivity and the binding strength to the negative electrode active material layer, an intermediate layer may be formed on the surface of the current collector.

[3. Negative Electrode Active Material Layer]

The negative electrode active material layer includes a negative electrode active material and a negative electrode polymer. In the negative electrode active material layer, the negative electrode polymer functions as a binder to hold the negative electrode active material within the negative electrode active material layer. The negative electrode active material layer may contain an optional component in addition to the negative electrode active material and the negative electrode polymer.

[3.1. Negative Electrode Active Material]

The negative electrode active material is an electrode active material for the negative electrode and is a material capable of transferring electron in the negative electrode of the secondary battery. In, e.g., a lithium ion secondary battery, a material that can store and release lithium is usually used as the negative electrode active material.

Preferred examples of the negative electrode active material may include carbon. Examples of the carbon may include natural graphite, artificial graphite, and carbon black. Of these, natural graphite is preferably used.

The negative electrode active material may preferably be a material containing one or more selected from the group consisting of tin, silicon, germanium, and lead. A negative electrode active material containing any of these elements has a small irreversible capacity.

Particularly, a negative electrode active material containing silicon is preferred. Use of the negative electrode active material containing silicon can increase electric capacity of the lithium ion secondary battery. Generally, the negative electrode active material containing silicon expands and contracts during charging and discharging to a large extent (for example, by a factor of about 5). However, in the negative electrode of the present invention, a reduction in the battery performance due to the expansion and contraction of the negative electrode active material can be suppressed.

As the negative electrode active material, one type thereof may be solely used, or two or more types thereof may be used in combination at any ratio. Therefore, two or more types of the aforementioned negative electrode active materials may be used in combination. Particularly, it is preferable to use a composite material that contains a material containing silicon and another material. Preferred examples in this case may include a negative electrode active material containing a combination of carbon and one or both of metallic silicon and a silicon-based active material. In the negative electrode active material containing a combination of carbon and one or both of metallic silicon and a silicon-based active material, it is presumed that Li is intercalated into and deintercalated from the one or both of metallic silicon and a silicon-based active material at a high electric potential and that Li is intercalated into and deintercalated from carbon at a low electric potential. Expansion and contraction are thereby suppressed, so that the cycle property of the secondary battery can be improved.

Examples of the silicon-based active material of the negative electrode active material may include SiO, $SiO_2$, $SiO_x$ (0.01≤x<2), SiC, and SiOC, and $SiO_x$, SiC, and SiC are preferred. Of these, $SiO_x$ is particularly preferably used because the expansion of the negative electrode active material itself is suppressed. $SiO_x$ is a compound formed from metallic silicon and one or both of SiO and $SiO_2$. $SiO_x$ may be produced by, e.g., producing silicon monoxide gas by heating a mixture of $SiO_2$ and metallic silicon, and then cooling the gas to cause precipitation.

When a combination of carbon and one or both of metallic silicon and a silicon-based active material is used, it is preferable that the one or both of metallic silicon and a silicon-based active material are in a form of a composite with conductive carbon. The use of the composite with conductive carbon can suppress expansion of the negative electrode active material itself.

Examples of the method for forming the composite may include: a method in which the one or both of metallic silicon and a silicon-based active material are coated with carbon to obtain the composite; and a method in which a mixture containing conductive carbon and the one or both of metallic silicon and a silicon-based active material is granulated to obtain the composite.

Examples of the method in which the one or both of metallic silicon and a silicon-based active material are coated with carbon may include: a method in which the one or both of metallic silicon and a silicon-based active material are subjected to heat treatment for disproportionation; and a method in which the one or both of metallic silicon and a silicon-based active material are subjected to heat treatment and chemical vapor deposition.

One specific example of the aforementioned methods is a method in which $SiO_x$ is subjected to heat treatment in an atmosphere containing at least one or both of organic material gas and organic vapor. The range of temperature during the heat treatment is usually 900° C. or higher, preferably 1,000° C. or higher, more preferably 1,050° C. or higher, and still more preferably 1,100° C. or higher, and is usually 1,400° C. or lower, preferably 1,300° C. or lower, and more preferably 1,200° C. or lower. With this method, $SiO_x$ can be disproportionated into a composite of silicon and silicon dioxide, and carbon can be chemically deposited onto the surface of the composite.

Another specific example is the following method. That is, one or both of metallic silicon and a silicon-based active material are disproportionated by heat treatment in an inert gas atmosphere to obtain a silicon composite. The range of temperature during this heat treatment is usually 900° C. or higher, preferably 1,000° C. or higher, and more preferably 1,100° C. or higher, and is usually 1,400° C. or lower, and preferably 1,300° C. or lower. The silicon composite thus obtained is pulverized to a grain size of preferably 0.1 µm to 50 µm. The pulverized silicon composite is heated at 800° C. to 1,400° C. in an inert gas flow. The heated silicon composite is subjected to heat treatment in an atmosphere containing at least one or both of organic material gas and organic vapor to chemically deposit carbon on the surface of the silicon composite. The range of temperature during this heat treatment is usually 800° C. or higher, preferably 900° C. or higher, and more preferably 1,000° C. or higher, and is usually 1,400° C. or lower, preferably 1,300° C. or lower, and more preferably 1,200° C. or lower.

Still another specific example is the following method. That is, one or both of metallic silicon and a silicon-based active material are subjected to chemical vapor deposition treatment using one or both of organic material gas and organic vapor. The range of temperature during the chemical vapor deposition treatment is usually 500° C. to 1,200° C., preferably 500° C. to 1,000° C., and more preferably 500° C. to 900° C. The resultant material is subjected to heat treatment in an inert gas atmosphere at usually 900° C. or higher, preferably 1,000° C. or higher, and more preferably 1,100° C. or higher, and usually 1,400° C. or lower, and preferably 1,300° C. or lower to disproportionate the material.

When a negative electrode active material containing a combination of carbon and one or both of metallic silicon and a silicon-based active material is used, the amount of silicon atoms in the negative electrode active material is preferably 0.1 parts by weight to 50 parts by weight based on 100 parts by weight of the total amount of carbon atoms. Thereby a favorable conductive path can be formed, and good conductivity of the negative electrode can be obtained.

When a negative electrode active material containing a combination of carbon and one or both of metallic silicon and a silicon-based active material is used, it is preferable that the weight ratio of carbon with respect to the one or both of metallic silicon and a silicon-based active material ("the weight of carbon"/"the weight of metallic silicon and the silicon-based active material") is within a specific range. More specifically, the weight ratio is preferably 50/50 or higher, more preferably 70/30 or higher, and is preferably 97/3 or lower and more preferably 90/10 or lower. Thereby the cycle property of the secondary battery can be improved.

Preferably, the negative electrode active material is granulated into particles. When particles having a spherical shape are used for electrode formation, a denser electrode can be formed. Therefore, when a composite material including a material containing silicon and another material is used as the negative electrode active material as in the aforementioned manner, it is preferable to use composite particles including the material containing silicon and another material as the negative electrode active material.

When the negative electrode active material is a particulate matter, the volume average particle diameter of the particles is appropriately selected in consideration of other constituent elements of the secondary battery. The volume average particle diameter is usually 0.1 µm or more, preferably 1 µm or more, and more preferably 5 µm or more, and is usually 100 µm or less, preferably 50 µm or less, and more preferably 20 µm or less. The volume average particle diameter is a particle diameter when a cumulative volume calculated from a small-diameter side in a particle size distribution measured by a laser diffraction method reaches 50%.

From the viewpoint of improving output power density, the specific surface area of the negative electrode active material is usually 2 $m^2/g$ or more, preferably 3 $m^2/g$ or more, and more preferably 5 $m^2/g$ or more, and is usually 20 $m^2/g$ or less, preferably 15 $m^2/g$ or less, and more preferably 10 $m^2/g$ or less. The specific surface area of the negative electrode active material may be measured by, e.g., a BET method.

[3.2. Negative Electrode Polymer]

As the negative electrode polymer, a particulate polymer is used. When the negative electrode polymer is contained, the particles of the negative electrode active material can be bound to each other through the negative electrode polymer, and the negative electrode active material layer and the current collector can also be bound to each other through the negative electrode polymer. Therefore, the possibility of the occurrence of a short circuit caused by a substance detached from the negative electrode active material layer can be reduced, and the reliability of the secondary battery can be increased. Since the negative electrode polymer is in a particulate form, it is not surface-bound to but point-bound to the negative electrode active material. Thereby most of the surface of the negative electrode active material is not covered with the negative electrode polymer, and the area of sites in which ions are exchanged between an electrolytic solution and the negative electrode active material can be increased. Therefore, usually, the internal resistance of the secondary battery can be reduced, and the output property and rate property of the secondary battery can be improved. In addition, the negative electrode polymer can improve the strength of the negative electrode active material layer, whereby the strength against mechanical force applied during, e.g., the step of winding the negative electrode can be increased.

As the negative electrode polymer, it is preferable to use a polymer having high ability to hold the negative electrode active material and exhibiting high binding property to the current collector. The negative electrode polymer may be a homopolymer and may also be a copolymer. Particularly, the negative electrode polymer is preferably a polymer including an aliphatic conjugated diene-based monomer unit. Since the aliphatic conjugated diene-based monomer unit is a soft structural unit with low rigidity, use of a polymer containing the aliphatic conjugated diene-based monomer unit can result in sufficient binding property between the negative electrode active material layer and the current collector.

The aliphatic conjugated diene-based monomer unit is a structural unit obtained by polymerization of an aliphatic conjugated diene-based monomer. Examples of the aliphatic conjugated diene-based monomer may include 1,3-butadiene, 2-methyl-1,3-butadiene, 2,3-dimethyl-1,3 butadiene, 2-chloro-1,3-butadiene, substituted linear-chain conjugated pentadienes, and substituted side-chain conjugated hexadienes. Of these, 1,3-butadiene is preferred. As the aliphatic conjugated diene-based monomer, one type thereof may be solely used, or two or more types thereof may be used in combination at any ratio.

In the negative electrode polymer, the ratio of the aliphatic conjugated diene-based monomer unit is usually 20% by weight or more, and preferably 25% by weight or more, and is usually 50% by weight or less, and preferably 45% by weight or less. When the ratio of the aliphatic conjugated diene-based monomer unit is within the aforementioned range, the degree of swelling can be suppressed, and the durability of the negative electrode can be improved. Usually, the ratio of the aliphatic conjugated diene-based monomer unit in the polymer coincides with the ratio (feed ratio) of the aliphatic conjugated diene-based monomer with respect to the total amount of monomers for the polymer.

Preferably, the negative electrode polymer contains an aromatic vinyl-based monomer unit. The aromatic vinyl-based monomer unit is stable and can reduce the solubility of the polymer containing the aromatic vinyl-based monomer unit in an electrolytic solution to thereby stabilize the negative electrode active material layer.

The aromatic vinyl-based monomer unit is a structural unit obtained by polymerization of an aromatic vinyl-based monomer. Examples of the aromatic vinyl-based monomer may include styrene, α-methylstyrene, vinyltoluene, and divinylbenzene. Of these, styrene is preferred. The negative electrode polymer is preferably a polymer containing both the aliphatic conjugated diene-based monomer unit and the aromatic vinyl-based monomer unit and is preferably, e.g., a styrene-butadiene copolymer. As the aromatic vinyl-based monomer, one type thereof may be solely used, or two or more types thereof may be used in combination at any ratio.

In the negative electrode polymer, the ratio of the aromatic vinyl-based monomer unit is usually 30% by weight or more, and preferably 35% by weight or more, and is usually 79.5% by weight or less, and preferably 69% by weight or less. When the ratio of the aromatic vinyl-based monomer unit is equal to or higher than the lower limit of the aforementioned range, the electrolytic solution resistance of the negative electrode can be increased. When the ratio is equal to or lower than the upper limit, sufficient binding property between the negative electrode active material layer and the current collector can be obtained. The ratio of the aromatic vinyl-based monomer unit in the polymer coincides with the ratio (feed ratio) of the aromatic vinyl-based monomer with respect to the total amount of monomers for the polymer.

Preferably, the negative electrode polymer contains an ethylenically unsaturated carboxylic acid monomer unit. The ethylenically unsaturated carboxylic acid monomer unit is a structural unit having high strength and containing a carboxyl group (—COOH group) that increases adsorbability to the negative electrode active material and the current collector. Therefore, detachment of the negative electrode active material from the negative electrode active material layer can be stably prevented, and the strength of the negative electrode can be improved.

The ethylenically unsaturated carboxylic acid monomer unit is a structural unit obtained by polymerization of an ethylenically unsaturated carboxylic acid monomer. Examples of the ethylenically unsaturated carboxylic acid monomer may include monocarboxylic acids and dicarboxylic acids such as acrylic acid, methacrylic acid, crotonic acid, maleic acid, fumaric acid, and itaconic acid, and anhydrides thereof. Of these, monomers selected from the group consisting of acrylic acid, methacrylic acid, itaconic acid, and combinations thereof are preferred from the viewpoint of the stability of a negative electrode slurry. As the ethylenically unsaturated carboxylic acid monomer, one type thereof may be solely used, or two or more types thereof may be used in combination at any ratio.

In the negative electrode polymer, the ratio of the ethylenically unsaturated carboxylic acid monomer unit is usually 0.5% by weight or more, preferably 1% by weight or more, and more preferably 2% by weight or more, and is usually 10% by weight or less, preferably 8% by weight or less, and more preferably 7% by weight or less. When the ratio of the ethylenically unsaturated carboxylic acid monomer unit is equal to or higher than the lower limit of the aforementioned range, the stability of the negative electrode slurry can be increased. When the ratio is equal to or lower than the upper limit, an excessive increase in the viscosity of the negative electrode slurry can be prevented, so that the negative electrode slurry can be easily handled. The ratio of the ethylenically unsaturated carboxylic acid monomer unit in the polymer usually coincides with the ratio (feed ratio) of the ethylenically unsaturated carboxylic acid monomer with respect to the total amount of monomers for the polymer.

The negative electrode polymer may contain an optional structural unit other than the aforementioned structural units, so long as the effects of the present invention are not significantly impaired. Examples of the monomer corresponding to the optional structural unit may include vinyl cyanide-based monomers, unsaturated carboxylic acid alkyl ester monomers, unsaturated monomers containing a hydroxyalkyl group, and unsaturated carboxylic acid amide monomers. One type thereof may be solely used, or two or more types thereof may be used in combination at any ratio.

Further, as the negative electrode polymer, one type thereof may be solely used, or two or more types thereof may be used in combination at any ratio.

The weight average molecular weight of the negative electrode polymer is preferably 10,000 or more, and more preferably 20,000 or more, and is preferably 1,000,000 or less, and more preferably 500,000 or less. When the weight average molecular weight is within the aforementioned range, high strength of the negative electrode and good dispersibility of the negative electrode active material can be easily obtained. The weight average molecular weight of the negative electrode polymer may be determined as a polystyrene equivalent value measured by gel permeation chromatography (GPC) using tetrahydrofuran as a developing solvent.

The glass transition temperature of the negative electrode polymer is preferably −75° C. or higher, more preferably −55° C. or higher, and particularly preferably −35° C. or higher, and is usually 40° C. or lower, preferably 30° C. or lower, more preferably 20° C. or lower, and particularly preferably 15° C. or lower. When the glass transition temperature of the negative electrode polymer is within the aforementioned range, properties such as the flexibility, binding property, and winding property of the negative electrode and the binding property between the negative electrode active material layer and the current collector are highly balanced, which is preferable.

Usually, the negative electrode polymer is water-insoluble particles. Therefore, in the negative electrode slurry, the negative electrode polymer is not dissolved in but is dispersed in the form of particles in water that is used as a solvent.

The number average particle diameter of the particles of the negative electrode polymer is preferably 50 nm or more, and more preferably 70 nm or more, and is preferably 500 nm or less, and more preferably 400 nm or less. When the number average particle diameter of the particles of the negative electrode polymer is within the aforementioned range, the negative electrode to be obtained can have high strength and good flexibility.

The number average particle diameter of particles may be measured in the following manner. Two hundred particles are randomly selected in a photograph taken with an electron microscope. In the image of each particle, let the longest axis be La, and the shortest axis be Lb. The diameter of the particle is defined as (La+Lb)/2, and the number average particle diameter is calculated as the average of the diameters of the 200 particles.

The negative electrode polymer can be produced, e.g., by polymerizing a monomer composition containing the aforementioned monomer(s) in an aqueous solvent to form polymer particles.

The ratio of each of the monomers in the monomer composition is usually the same as the ratio of the structural unit (for example, the aliphatic conjugated diene-based monomer unit, the aromatic vinyl-based monomer unit, and the ethylenically unsaturated carboxylic acid monomer unit, etc.) in the negative electrode polymer.

No particular limitation is imposed on the aqueous solvent so long as the particles of the negative electrode polymer can be dispersed in the solvent. An aqueous solvent having a boiling point at normal pressure of usually 80° C. or higher, and preferably 100° C. or higher, and usually 350° C. or lower, and preferably 300° C. or lower may be used. In the following, examples of such an aqueous solvent will be described. In the following exemplification, figures in parentheses after the name of a solvent represent a boiling point (unit: ° C.) at normal pressure with the fractional portion of the value rounded or truncated.

Examples of the aqueous solvent may include water (100); ketones such as diacetone alcohol (169) and γ-butyrolactone (204); alcohols such as ethyl alcohol (78), isopropyl alcohol (82), and normal propyl alcohol (97); glycol ethers such as propylene glycol monomethyl ether (120), methyl cellosolve (124), ethyl cellosolve (136), ethylene glycol tertiary butyl ether (152), butyl cellosolve (171), 3-methoxy-3 methyl-1-butanol (174), ethylene glycol monopropyl ether (150), diethylene glycol monobutyl ether (230), triethylene glycol monobutyl ether (271), and dipropylene glycol monomethyl ether (188); and ethers such as 1,3-dioxolane (75), 1,4-dioxolane (101), and tetrahydrofuran (66). Of these, water is particularly preferred since it has no flammability and a dispersion of the particles of the negative electrode polymer can be easily obtained. Water may be used as a main solvent, and any of the aforementioned aqueous solvents other than water may be mixed with water within the range in which the dispersed state of the particles of the negative electrode polymer can be maintained.

No particular limitation is imposed on the method for polymerization. For example, any of a solution polymerization method, a suspension polymerization method, a bulk polymerization method, an emulsion polymerization method, etc. may be used. In the polymerization method used, a process such as ion polymerization, radical polymerization, or living radical polymerization may be used. Of these, the emulsion polymerization method is particularly preferred from the viewpoint of production efficiency, e.g., because a high-molecular weight polymer is easily obtained and, since the polymer is directly obtained in the form of dispersion in water and re-dispersion treatment is thus unnecessary, so that the dispersion can be directly used for producing the negative electrode slurry.

Usually, the emulsion polymerization method is performed in accordance with a conventional procedure. For example, the emulsion polymerization method is performed using a method described in "Jikken Kagaku Koza (Experimental Chemistry)" Vol. 28 (published by Maruzen Company, Limited, edited by The Chemical Society of Japan). Specifically, in this method, water, additives such as a dispersant, an emulsifier, and a cross-linking agent, a polymerization initiator, and monomers in a specific compositional ratio are placed in a sealed vessel equipped with a stirrer and a heater, and the composition in the vessel is stirred to emulsify the monomers etc. in water. Then temperature is raised under stirring to initiate polymerization. Alternatively, in this method, after the aforementioned composition is emulsified, the emulsion is placed in a sealed vessel, and the reaction is initiated in the same manner.

Examples of the polymerization initiator may include: organic peroxides such as lauroyl peroxide, diisopropyl peroxydicarbonate, di-2-ethylhexyl peroxydicarbonate, t-butyl peroxypivalate, and 3,3,5-trimethylhexanoyl peroxide; azo compounds such as α,α'-azobisisobutyronitrile; ammonium persulfate; and potassium persulfate. As the polymerization initiator, one type thereof may be solely used, or two or more types thereof may be used in combination at any ratio.

The emulsifier, dispersant, polymerization initiator, etc. are commonly used in these polymerization methods, and their amounts used are set to commonly used amounts. In the polymerization, seed polymerization employing seed particles may be performed.

The polymerization temperature and the polymerization time may be freely selected in accordance with the polymerization method, the type of the polymerization initiator, etc. Usually, the polymerization temperature is about 30° C. or higher, and the polymerization time is about 0.5 hours to about 30 hours.

An additive such as amine may be used as an auxiliary agent for polymerization.

The aqueous dispersion of the particles of the negative electrode polymer obtained by any of the aforementioned methods may be mixed with a basic aqueous solution containing, e.g., a hydroxide of an alkali metal (such as Li, Na, K, Rb, or Cs), ammonia, an inorganic ammonium compound (such as $NH_4Cl$), or an organic amine compound (such as ethanolamine or diethylamine), for adjusting pH of the aqueous dispersion within a desired range. The specific pH range is usually 5 to 10 and preferably 5 to 9. Particularly, it is preferable to adjust the pH using an alkali metal hydroxide because thereby the binding property between the current collector and the negative electrode active material (peel strength) can be improved.

The particles of the negative electrode polymer may be composite polymer particles composed of two or more types of polymers. The composite polymer particles may be obtained by, e.g., a method including polymerizing at least one monomer component in accordance with a conventional procedure, and then polymerizing at least one other monomer component, thereby polymerizing them in accordance with a conventional procedure (a two-stage polymerization method). When the monomers are polymerized in stages in this manner, particles having a core-shell structure including a core layer present inside the particles and a shell layer covering the core layer can be obtained.

The amount of the negative electrode polymer in the negative electrode active material layer based on 100 parts by weight of the negative electrode active material is preferably 0.1 parts by weight or more, more preferably 0.2 parts by weight or more, and particularly preferably 0.5 parts by weight or more, and is preferably 5 parts by weight or less, more preferably 4 parts by weight or less, and particularly preferably 3 parts by weight or less. When the amount of the negative electrode polymer is within the aforementioned range, detachment of the negative electrode active material from the negative electrode active material layer can be prevented without inhibition of a battery reaction.

[3.3. Optional Component that May be Contained in Negative Electrode Active Material Layer]

The negative electrode active material layer may contain an optional component other than the negative electrode active material and the negative electrode polymer, so long as the effects of the present invention are not significantly impaired. Examples of the optional component may include a conducting material (also referred to as a conductivity-imparting material) and a reinforcing material. As the optional component, one type thereof may be solely used, or two or more types thereof may be used in combination at any ratio.

Examples of the conducting material may include: conductive carbon such as acetylene black, Ketjen black, carbon black, graphite, vapor phase-grown carbon fibers, and carbon nanotubes; powders of carbon such as graphite powder; and fibers and foils of a variety of metals. Use of the conducting material can improve the electric contact between the particles of the negative electrode active material. Particularly, when the conducting material is used for a lithium secondary battery, discharging rate property can be improved.

As the reinforcing material, a variety of inorganic and organic spherical, plate-shaped, rod-shaped, and fiber-shaped fillers may be used.

The using amount of each of the conducting material and the reinforcing material based on 100 parts by weight of the negative electrode active material is usually 0 parts by weight or more, and preferably 1 part by weight or more, and is usually 20 parts by weight or less, and preferably 10 parts by weight or less.

[3.4. Thickness of Negative Electrode Active Material Layer]

The thickness of the negative electrode active material layer is usually 5 μm or more, and preferably 10 μm or more, and is usually 300 μm or less, and preferably 250 μm or less.

[4. Porous Membrane]

The porous membrane contains non-conductive particles and a porous membrane polymer. In the porous membrane, gaps between the non-conductive particles form pores of the porous membrane. The porous membrane polymer functions as a binder to hold the non-conductive particles within the porous membrane. The porous membrane may contain an optional component in addition to the non-conductive particles and the porous membrane polymer.

[4.1. Non-conductive Particles]

The non-conductive particles are particles of a polymer including a structural unit formed by polymerization of (meth)acrylate (this structural unit may be appropriately referred to hereinbelow as a "(meth)acrylate unit", and the polymer may be appropriately referred to hereinbelow as a "(meth)acrylate polymer"). That is, particles of the (meth)acrylate polymer including a structural unit formed by polymerization of one or both of acrylate and methacrylate are used as the non-conductive particles. When the non-conductive particles are formed from the (meth)acrylate polymer, the electric stability of the porous membrane can be improved. When the porous membrane polymer has polarity, the compatibility between the non-conductive particles and the porous membrane polymer can be improved since the (meth)acrylate unit has polarity, whereby their binding property can be enhanced. Particularly, when the porous membrane polymer includes the (meth)acrylate unit, the compatibility between the non-conductive particles and the porous membrane polymer is significantly improved, so that their binding property can be significantly improved.

In the (meth)acrylate polymer, the ratio of the (meth)acrylate unit is usually 50% by weight or more, preferably 60% by weight or more, and more preferably 70% by weight or more and is 100% by weight or less. When the ratio of the (meth)acrylate unit is within the aforementioned range, the compatibility between the non-conductive particles and the porous membrane polymer can be improved, so that the binding property between the non-conductive particles and the porous membrane polymer and the membrane strength of the porous membrane can be improved. Thereby the durability of the negative electrode against expansion and contraction of the negative electrode active material can be improved, so that the cycle property and reliability of the secondary battery can be improved. Usually, the ratio of the (meth)acrylate unit in the (meth)acrylate polymer coincides with the ratio (feed ratio) of (meth)acrylate with respect to the total amount of monomers for the (meth)acrylate polymer.

Among (meth)acrylates, examples of acrylate may include: monoacrylates such as methyl acrylate, ethyl acrylate, butyl acrylate, and 2-ethylhexylethyl acrylate; diacrylates such as polyethylene glycol diacrylate, 1,3-butylene glycol diacrylate, 1,6-hexane glycol diacrylate, neopentyl glycol diacrylate, polypropylene glycol diacrylate, 2,2'-bis(4-acryloxypropyloxyphenyl)propane, and 2,2'-bis(4-acryloxydiethoxyphenyl)propane; triacrylates such as trimethylolpropane triacrylate, trimethylolethane triacrylate, and tetramethylolmethane triacrylate; and tetraacrylates such as tetramethylolmethane tetraacrylate. One type thereof may be solely used, or two or more types thereof may be used in combination at any ratio.

Examples of methacrylate may include: monomethacrylates such as methyl methacrylate, butyl methacrylate, and 2-ethylhexyl methacrylate; dimethacrylates such as ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexaneglycol dimethacrylate, neopentyl glycol dimethacrylate, dipropylene glycol dimethacrylate, polypropylene glycol dimethacrylate, and 2,2'-bis(4-methacryloxydiethoxyphenyl)propane; and trimethacrylates such as trimethylolpropane trimethacrylate and trimethylolethane trimethacrylate. One type thereof may be solely used, or two or more types thereof may be used in combination at any ratio.

The (meth)acrylate polymer may be a copolymer of one or both of acrylate and methacrylate and a monomer other than acrylate and methacrylate. Examples of the monomer other than acrylate and methacrylate may include: monocarboxylic acids and dicarboxylic acids such as acrylic acid, methacrylic acid, maleic acid, and itaconic acid and acid anhydrides of dicarboxylic acids; aliphatic conjugated diene-based monomers such as 1,3-butadiene, 2-methyl-1,3-butadiene, 2,3-dimethyl-1,3 butadiene, and 2-chloro-1,3-butadiene; and aromatic vinyl-based monomers such as styrene, α-methylstyrene, vinyltoluene, and divinylbenzene. One type thereof may be solely used, or two or more types thereof may be used in combination at any ratio.

The (meth)acrylate polymer forming the non-conductive particles has a softening starting point or decomposition point of usually 175° C. or higher, preferably 200° C. or higher, and more preferably 225° C. or higher. The (meth)acrylate polymer having such a high softening starting point or decomposition point can prevent the non-conductive particles from melting during a heating step for producing the negative electrode. Therefore, the strength of the porous membrane can be increased. In addition, the (meth)acrylate polymer having such a high softening starting point or decomposition point can prevent the occurrence of an internal short circuit of the secondary battery in a high-temperature environment. No particular limitation is imposed on the upper limit of the softening starting point or decomposition point of the (meth)acrylate polymer, but the softening starting point or decomposition point is usually 500° C. or lower. When both the softening starting point and decomposition point of the (meth)acrylate polymer are observed, the lower one of the softening starting point and the decomposition point is within the aforementioned temperature range.

The softening starting point may be measured as follows. Firstly, 10 mg of a measurement sample is weighed into an aluminum pan. With an empty aluminum pan as a reference, a DSC curve is measured at room temperature and room humidity using a differential thermal analysis apparatus with a measurement temperature range of −100° C. to 500° C. in a nitrogen atmosphere at a temperature rising rate of 10° C./min. In this heating process, the intersection of a base line immediately before the onset of an endothermic peak in the DSC curve at which a differential signal (DDSC) is 0.05 mW/min/mg or higher and the tangent line of the DSC curve at a first inflection point after the onset of the endothermic peak is taken as glass transition temperature (Tg). A temperature higher by 25° C. than the glass transition temperature is taken as the softening starting point.

The decomposition point may be measured as follows. A measurement sample is heated from 30° C. at a temperature rising rate of 10° C./min in a nitrogen atmosphere using a thermogravimetry/differential thermal analyzer. In this case, the temperature at which the ratio of weight reduction becomes 10% by weight is taken as the decomposition point.

The number average particle diameter of the non-conductive particles is preferably 100 nm or more, more preferably 200 nm or more, and particularly preferably 300 nm or more, and is preferably 2,000 nm or less, more preferably 1,500 nm or less, and particularly preferably 1,000 nm or less. When the number average particle diameter of the non-conductive particles is equal to or higher than the lower limit of the aforementioned range, the gaps between the non-conductive particles can be increased, so that the size of the pores of the porous membrane can be increased. Therefore, migration of ions through the pores of the porous membrane is facilitated, and the output power of the secondary battery can thereby be increased. When the number average particle diameter of the non-conductive particles is equal to or lower than the upper limit of the aforementioned range, the uniformity of the porous membrane can be increased, so that the occurrence of a local reduction in the strength of the porous membrane or a local reduction in binding property can be prevented. Therefore, the durability of the negative electrode against the expansion and contraction of the negative electrode active material can be improved, so that the cycle property of the secondary battery can be improved.

The variation coefficient in the particle diameter of the non-conductive particles is preferably 26% or less, more preferably 23% or less, and particularly preferably 20% or less, and is usually 0% or more. When the variation coefficient in the particle diameter of the non-conductive particles is such a small value, excessively dense gathering of the non-conductive particles can be prevented. Therefore, e.g., the pores of the porous membrane can be prevented from being clogged with small particles, so that the migration of ions through the pores of the porous membrane can be facilitated, and the output power of the secondary battery can thereby by increased. The variation coefficient in particle diameter herein means the quotient obtained by dividing the standard deviation of the particle diameter by the arithmetic mean particle diameter.

The variation coefficient in particle diameter may be measured in the following manner. Two hundred particles are randomly selected in a photograph taken under an electron microscope. In the image of each particle, let the longest axis be La, and the shortest axis be Lb. The diameter of the particle is defined as (La+Lb)/2, and the number average particle diameter is calculated as the average of the diameters of the 200 particles. The standard deviation of the particle diameter of the 200 particles is calculated and then divided by the number average particle diameter, whereby the variation coefficient can be calculated.

The non-conductive particles may be produced, e.g., by preparing a monomer composition containing monomers for a polymer forming the non-conductive particles and then polymerizing the monomers in the monomer composition. Preferably, in this production method, the monomers and, if necessary, other optional components are dissolved or dispersed in a medium, and polymerization is performed in the liquid.

Examples of the medium that may be employed for the polymerization may include water, organic solvents, and mixtures thereof. As the organic solvent, a solvent that is inert to radical polymerization and does not inhibit the polymerization of the monomers may be used as the medium. Specific examples of the organic solvent may include: alcohols such as methanol, ethanol, propanol, cyclohexanol, and octanol; esters such as dibutyl phthalate and dioctyl phthalate; ketones such as cyclohexanone; and solution mixtures thereof. It is preferable to use an aqueous medium such as water as the medium, and employ emulsion polymerization as the polymerization method.

In the emulsion polymerization, it is preferable to perform polymerization in a plurality of separate stages, for obtaining a desired shape. For example, the non-conductive particles may be obtained by firstly polymerizing part of the monomers to form seed polymer particles, then causing the rest of the monomers to be absorbed into the seed polymer particles, and performing polymerization while keeping that state. Further, upon forming the seed polymer particles, the polymerization may be further divided into a plurality of stages. Preferably, among the monomers, a (meth)acrylic-based polyfunctional monomer such as diacrylate, triacrylate, tetraacrylate, dimethacrylate, or trimethacrylate is added, as a monomer to be reacted with the seed polymer particles, to the reaction system of the reaction of the seed polymer particles and the monomers, for performing polymerization.

It is preferable that, when the seed polymer particles are reacted with the monomers, the ratio of the amount of the monomers with respect to the amount of the seed polymer particles is within a specific range. Specifically, the ratio of the monomers with respect to 1 part by weight of the seed polymer particles is preferably 2 parts by weight or more, more preferably 3 parts by weight or more, and still more preferably 4 parts by weight or more, and is preferably 19 parts by weight or less, more preferably 16 parts by weight or less, and still more preferably 12 parts by weight or less. When the ratio of the monomers is equal to or higher than the lower limit of the aforementioned range, the mechanical strength and heat resistance of the obtained non-conductive particles can be improved. When the ratio is equal to or lower than the upper limit, the amount ratio of the monomers is within the range in which the ability of the seed polymer particles to absorb the monomers is not insufficient. Therefore, the amount of monomers that are not absorbed into the seed polymer particles can be maintained to be in a low range, and the particle diameter of the seed polymer particles can be well controlled. Thereby the occurrence of coarse particles and the occurrence of a large amount of fine particles can be suppressed, and the particle diameter distribution of the obtained non-conductive particles can be narrowed, so that the variation coefficient in the particle diameter of the non-conductive particles can be reduced.

Specific examples of the procedure of polymerization may include: a method in which the monomers are added at once to an aqueous dispersion of the seed polymer particles; and a method in which the monomers are added intermittently or continuously to the reaction system while polymerization is performed. Particularly, it is preferable that the monomers are absorbed into the seed polymer particles before polymerization is initiated and cross-links substantially occurs in the seed polymer particles. When it is attempted to cause the monomers to be absorbed into the seed polymer particles at the middle or late stage of polymerization, the monomers are less likely to be absorbed into the seed polymer particles. Therefore, a large amount of fine particles are formed, and this deteriorates stability of polymerization, and hinders maintenance of polymerization reaction. It is therefore preferable that all the monomers are added to the seed polymer particles before the polymerization is initiated or the addition of all the monomers is completed before the polymerization conversion ratio reaches about 30%. Particularly preferably, the monomers are added to an aqueous dispersion of the seed polymer particles and stirred before the polymerization is initiated for effecting absorption of the monomers by the seed polymer particles, and thereafter the polymerization is initiated.

In addition to the aforementioned monomers, seed polymer particles and medium, the reaction system for polymerization may contain an optional component. Examples of the optional component may include a polymerization initiator, a polymerization inhibitor, a chain transfer agent, a suspension protecting agent, and a surfactant. One type thereof may be solely used, or two or more types thereof may be used in combination at any ratio.

The polymerization initiator for use may be, e.g., a water-soluble radical polymerization initiator or an oil-soluble radical polymerization initiator. Of these, a water-soluble polymerization initiator is preferably used, because polymerization of monomers not absorbed into the seed polymer particles is less likely to be initiated in an aqueous phase.

Examples of the water-soluble radical initiator may include potassium persulfate, sodium persulfate, cumene hydroperoxide, hydrogen peroxide, and redox-based initiators that are combinations of these aforementioned reducing agents.

Examples of the oil-soluble polymerization initiator may include benzoyl peroxide, $\alpha,\alpha'$-azobisisobutyronitrile, t-butylperoxy-2-ethylhexanoate, and 3,5,5-trimethylhexanoyl peroxide. t-Butylperoxy-2-ethylhexanoate is preferred among the oil-soluble polymerization initiator.

Examples of the polymerization inhibitor may include potassium dichromate, ferric chloride, and hydroquinone. The polymerization inhibitors exemplified herein are water-soluble polymerization inhibitors. When the reaction system contains a small amount of such a polymerization inhibitor, formation of fine particles can be suppressed.

Usually, the chain transfer agent is used for the purpose of controlling the molecular weight of a polymer. Examples of the chain transfer agent may include mercaptans such as octyl mercaptan, dodecyl mercaptan, and tert-dodecyl mercaptan, n-octyl-3-mercaptopropionate, terpinolene, carbon tetrabromide, and an $\alpha$-methylstyrene dimer.

Examples of the suspension protecting agent may include polyvinyl alcohol, carboxymethyl cellulose, and sodium polyacrylate.

Examples of the surfactant may include: anionic surfactants such as sodium dodecylbenzene sulfonate, sodium laurylsulfate, sodium dialkylsulfosuccinates, and formalin condensate of naphthalenesulfonic acid; and nonionic surfactants such as polyoxyethylene nonylphenyl ether, polyethylene glycol monostearate, and sorbitan monostearate. A combination of any of these anionic surfactants and nonionic surfactants may also be used.

When a polymerization initiator and a surfactant are used in combination, it is preferable to use a water-soluble polymerization initiator in combination with a surfactant at a concentration equal to or lower than its C.M.C concentration in the polymerization system and close to the C.M.C concentration. The C.M.C concentration stands for critical micelle concentration, and a concentration close to the C.M.C concentration usually means a concentration 0.3 to 1.0 time the C.M.C concentration. Thereby the surfactant can function as a stabilizer, so that, while the stability of the reaction system during polymerization is ensured, non-conductive particles having a narrow particle diameter distribution with intended particle diameters can be obtained with high reproducibility in a well-controlled manner.

The content ratio of the non-conductive particles in the porous membrane is preferably 60% by weight or more, and more preferably 65% by weight or more, and is preferably 95% by weight or less. When the content ratio of the non-conductive particles in the porous membrane is within the aforementioned range, gaps can be formed between the non-conductive particles while the non-conductive particles are in contact with each other at their contact portions to such an extent that the migration of ions is not inhibited. Therefore, when the content ratio of the non-conductive particles is within the aforementioned range, the strength of the porous membrane can be improved, and the occurrence of a short circuit in the secondary battery can be stably prevented.

[4.2. Porous Membrane Polymer]

The porous membrane polymer is a component that is capable of binding the non-conductive particles to each other and binding the non-conductive particles to the negative electrode active material layer. As the porous membrane polymer, a non-particulate polymer may be used. "Non-particulate polymer" used herein means a polymer that is in a dissolved state in a porous membrane slurry, and that, when the porous membrane slurry is applied onto a substrate and dried, enters the gaps between the non-conductive particles and the gaps between the negative electrode active material layer and the non-conductive particles. Thereby the porous membrane polymer is not point-bound to but surface-bound to the non-conductive particles. Therefore, the porous membrane polymer and the non-conductive particles can be bound to each other over a large area, and the binding property between the porous membrane polymer and the non-conductive particles can thereby be significantly enhanced, whereby the mechanical strength of the porous membrane can be improved. When the non-particulate polymer is used as the porous membrane polymer, the size of the pores of the porous membrane is expected to be smaller than that when a particulate polymer is used as the porous membrane polymer. However, even when the non-particulate porous membrane polymer is used, not all the pores of the porous membrane are clogged with the porous membrane polymer, and the porosity of the porous membrane is not impaired. Therefore, the migration of ions through the pores of the porous membrane is not impeded, and no reduction in the output power of the secondary battery occurs.

Further, in the porous membrane, the porous membrane polymer is cross-linked. That is, the porous membrane polymer has a cross-linked structure. Therefore the strength of the porous membrane polymer in the porous membrane is elevated, and the strength of the porous membrane can thereby be increased.

As described above, the porous membrane polymer is surface-bound to the non-conductive particles. Since the porous membrane polymer is cross-linked while its surface-bound state is maintained, the binding property between the porous membrane polymer and the non-conductive particles are further enhanced by the cross-linking.

Since, as described above, the binding property between the non-conductive particles and the porous membrane polymer is high, and, in addition, the porous membrane polymer is cross-linked, the strength of the porous membrane is high. Therefore, breakage of the porous membrane due to the expansion and contraction of the negative electrode active material layer during charging and discharging is suppressed. Therefore, the porous membrane exhibits the effect of protecting the active material layer, and the cycle property of the secondary battery can thereby be improved. In addition, since the occurrence of a short circuit can be stably suppressed, a highly reliable secondary battery can be realized.

The porous membrane polymer may be a homopolymer or a copolymer. Since the porous membrane polymer has a cross-linked structure, the porous membrane polymer may be produced, e.g., by polymerizing a monomer having a cross-linkable group. Alternatively, the porous membrane polymer may be produced by, e.g., polymerizing any monomer with a polymerization initiator having a cross-linkable group. The polymerization temperature may be set within the range in which the cross-linking reaction does not proceed during polymerization so that the produced polymer does not become insoluble in the solvent. Specifically, the polymerization temperature is usually 40° C. or higher, and is usually 100° C. or lower. The cross-linkable group means a group that is cross-linkable.

Examples of the cross-linkable group may include an epoxy group, a carboxyl group, a sulfo group (may also be referred to as a "sulfonic acid group"), an N-methylolamido group, an oxetanyl group, and an oxazoline group. As the cross-linkable group, one type thereof may be solely used, or two or more types thereof may be used in combination at any ratio. Of these, an epoxy group, a carboxyl group, and a sulfo group are preferred. Therefore, preferably, the porous membrane polymer in the porous membrane includes a cross-linked structure formed by one or more types of groups selected from the group consisting of an epoxy group, a carboxyl group, and a sulfo group.

Preferably, the aforementioned preferred cross-linkable groups are used in combination. For example, a combination of an epoxy group and a sulfo group or a combination of an epoxy group and a carboxyl group may result in efficient cross-linked structure formation. Of these, a combination of an epoxy group and a sulfo group is particularly preferred because thereby the cross-linked structure can be formed more efficiently.

Examples of the monomer having an epoxy group may include: unsaturated glycidyl ethers such as vinyl glycidyl ether, allyl glycidyl ether, butenyl glycidyl ether, and o-allylphenyl glycidyl ether; monoepoxides of dienes and polyenes such as butadiene monoepoxide, chloroprene monoepoxide, 4,5-epoxy-2-pentene, 3,4-epoxy-1-vinylcyclohexene, and 1,2-epoxy-5,9-cyclododecadiene; alkenyl epoxides such as 3,4-epoxy-1-butene, 1,2-epoxy-5-hexene, and 1,2-epoxy-9-decene; and glycidyl esters of unsaturated carboxylic acids such as glycidyl acrylate, glycidyl methacrylate, glycidyl crotonate, glycidyl-4-heptenoate, glycidyl sorbate, glycidyl linoleate, glycidyl-4-methyl-3-pentenoate, glycidyl ester of 3-cyclohexenecarboxylic acid, and glycidyl ester of 4-methyl-3-cyclohexenecarboxylic acid.

Examples of the monomer having a carboxyl group may include monocarboxylic acids, dicarboxylic acids, anhydrides of dicarboxylic acids, and derivatives thereof. Examples of the monocarboxylic acids may include acrylic acid, methacrylic acid, crotonic acid, 2-ethylacrylic acid, isocrotonic acid, α-acetoxyacrylic acid, β-trans-aryloxyacrylic acid, α-chloro-β-E-methoxyacrylic acid, and β-diaminoacrylic acid. Examples of the dicarboxylic acids may include maleic acid, fumaric acid, itaconic acid, methylmaleic acid, dimethylmaleic acid, phenylmaleic acid, chloromaleic acid, dichloromaleic acid, and fluoromaleic acid. Examples of the derivatives of dicarboxylic acids may include maleic acid esters such as methyl allyl maleate, diphenyl maleate, nonyl maleate, decyl maleate, dodecyl maleate, octadecyl maleate, and fluoroalkyl maleate. Examples of the acid anhydrides of dicarboxylic acids may include maleic anhydride, acrylic anhydride, methylmaleic anhydride, and dimethylmaleic anhydride.

Examples of the monomer having a sulfo group may include vinylsulfonic acid, methylvinylsulfonic acid, (meth)allylsulfonic acid, styrenesulfonic acid, (meth)acrylic acid-2-sulfonic acid ethyl ester, 2-acrylamide-2-methylpropanesulfonic acid, 3-allyloxy-2-hydroxy propanesulfonic acid, and salts thereof.

Examples of the polymerization initiator having a cross-linkable group may include peroxodisulfate-based initiators such as potassium persulfate, ammonium persulfate, and sodium persulfate. The peroxodisulfate-based initiator is a polymerization initiator having a sulfo group as the cross-linkable group.

It is preferable that the ratio of the total amount of the monomer having a cross-linkable group and the polymerization initiator having a cross-linkable group with respect to the total amount of monomers for the porous membrane polymer is within a specific range. Specifically, the aforementioned ratio is usually 0.1% by weight or more, preferably 0.5% by weight or more, and more preferably 1.0% by weight or more, and is usually 20% by weight or less, preferably 15% by weight or less, and more preferably 10% by weight or less. When the ratio is equal to or higher than the lower limit of the aforementioned range, the porous membrane can have sufficient strength. When the ratio is equal to or lower than the upper limit, flexibility can be obtained.

As the monomer for the porous membrane polymer, an optional monomer other than the monomer having a cross-linkable group may also be used. Examples of the optional monomer may include (meth)acrylic acid esters. Since a structural unit formed by polymerization of a (meth)acrylic acid ester has high strength and is flexible, the flexibility of the porous membrane can be improved, and detachment of the non-conductive particles from the porous membrane during slitting and winding can be suppressed.

Examples of the (meth)acrylic acid ester may include: alkyl acrylates such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and alkyl methacrylates such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. One type thereof may be solely used, or two or more types thereof may be used in combination at any ratio.

The ratio of the (meth)acrylic acid ester with respect to the total weight of the monomers for the porous membrane polymer is usually 50% by weight or more, preferably 60% by weight or more, and more preferably 70% by weight or more, and is usually 98% by weight or less, preferably 95% by weight or less, and more preferably 90% by weight or less. When the ratio of the (meth)acrylic acid ester is equal to or higher than the lower limit of the aforementioned range, the binding property of the porous membrane polymer to the non-conductive particles can be improved. When the ratio is equal to or lower than the upper limit, the rigidity of the porous membrane can be increased. The ratio (feed ratio) of the (meth)acrylic acid ester with respect to the total amount of the monomers for the porous membrane polymer usually coincides with the ratio of the structural unit formed by polymerizing the (meth)acrylic acid ester in the polymer.

When a (meth)acrylic acid ester is used as a monomer, it is preferable to also use a (meth)acrylonitrile as a monomer in combination with the (meth)acrylic acid ester. Since a copolymer obtained by combining the (meth)acrylonitrile and the (meth)acrylic acid ester is stable to oxidation and reduction, a long-life battery can be easily obtained. In this case, only acrylonitrile or methacrylonitrile may be used as the monomer used in combination with the (meth)acrylic acid ester, and both acrylonitrile and methacrylonitrile may also be used.

The weight ratio of the (meth)acrylonitrile with respect to the (meth)acrylic acid ester (the weight ratio represented by "(meth)acrylonitrile/(meth)acrylic acid ester") is preferably 1/99 or more, and more preferably 5/95 or more, and is preferably 30/70 or less, and more preferably 25/75 or less. When the aforementioned weight ratio is equal to or higher than the lower limit of the aforementioned range, a reduction in ionic conductivity caused by swelling of the porous membrane polymer with an electrolytic solution can be prevented, and a reduction in rate property can be suppressed. When the aforementioned weight ratio is equal to or lower than the upper limit of the aforementioned range, a reduction in the strength of the porous membrane due to a reduction in the strength of the porous membrane polymer can be prevented. The weight ratio of the (meth)acrylonitrile as a monomer with respect to the (meth)acrylic acid ester usually coincides with the weight ratio of the structural unit formed by polymerization of the (meth)acrylonitrile with respect to the structural unit formed by polymerization of the (meth)acrylic acid ester in the porous membrane polymer.

As the porous membrane polymer, one type thereof may be solely used, or two or more types thereof may be used in combination at any ratio.

Since the porous membrane polymer is cross-linked, usually it is not dissolved in a solvent. However, in the porous membrane slurry, the porous membrane polymer is capable of being dissolved in the solvent of the slurry. This is because cross-linking of the porous membrane polymer is effected after application of the porous membrane slurry onto a substrate (usually, the negative electrode active material layer) and drying. Therefore, it is preferable to produce the porous membrane by: preparing a porous membrane polymer having cross-linkable groups; then applying and drying a porous membrane slurry containing the porous membrane polymer; and thereafter effecting cross-linking.

The porous membrane polymer having cross-linkable groups may be produced by, e.g., polymerizing a monomer composition containing the monomers for the porous membrane polymer in an aqueous solvent.

The aqueous solvent for the polymerization reaction may be, e.g., the same as that for the production of the negative electrode polymer.

The procedure for the polymerization reaction may be the same as that for the production of the negative electrode polymer. Thereby a dispersion in which the porous membrane polymer in a particulate form and having cross-linkable groups is dispersed in the aqueous solvent is usually obtained. Then solvent replacement is performed with a solvent that can dissolve the porous membrane polymer, to thereby obtain a solution containing the porous membrane polymer in a non-particulate form. Usually, a porous membrane slurry is produced using the porous membrane polymer dissolved in this solution, and a porous membrane may then be produced using this porous membrane slurry.

The amount of the porous membrane polymer in the porous membrane based on 100 parts by weight of the non-conductive particles is usually 2 parts by weight or more, preferably 4 parts by weight or more, and more preferably 6 parts by weight or more, and is usually 37 parts by weight or less, preferably 28 parts by weight or less, and more preferably 19 parts by weight or less. When the amount is equal to or more than the lower limit of the aforementioned range, the strength of the porous membrane can be increased. When the amount is equal to or less than the upper limit of the aforementioned range, the liquid permeability of the porous membrane can be increased to improve the rate property of the secondary battery.

[4.3. Optional Component]

In addition to the aforementioned components, the porous membrane may contain an optional component. No particular limitation is imposed on the optional component so long as it does not excessively give unfavorably influence to the battery reaction in the secondary battery. The optional component may be of one type, or may be two or more types.

[4.4. Thickness of Porous Membrane]

The thickness of the porous membrane is preferably 1 μm to 50 μm and particularly preferably 1 μm to 20 μm. When the thickness is set to be equal to or more than the lower limit of the aforementioned range, a uniform porous membrane can be easily produced. When the thickness is set to be equal to or lower than the upper limit of the aforementioned range, the capacity of the battery per unit volume (weight) can be increased.

[5. Method for Producing Negative Electrode]

The negative electrode of the present invention may be produced, e.g., by a production method including the step of applying a negative electrode slurry onto a current collector and drying the negative electrode slurry to obtain a negative electrode active material layer, the step of applying a porous membrane slurry onto the negative electrode active material layer and drying the porous membrane slurry, and the step of cross-linking the porous membrane polymer by heating. In the following, this production method will be described.

[5.1. Step of Forming Negative Electrode Active Material Layer]

For producing the negative electrode, the negative electrode slurry is prepared. The negative electrode slurry is a fluid composition containing the negative electrode active material, the negative electrode polymer in a particulate form, and water, and, if necessary, an optional component. In the negative electrode slurry, particles of the negative electrode active material and the negative electrode polymer are dispersed in water.

In the negative electrode slurry, water functions as a dispersion medium. It is usually preferable that the amount of water contained in the negative electrode slurry is adjusted in accordance with the type of the negative electrode active material and the type of the negative electrode polymer etc. such that a viscosity suitable for coating is obtained. Specifically, the amount of water used is adjusted such that the total concentration of solids including the negative electrode active material, the negative electrode polymer, and the optional component is preferably 30% by weight or more, and more preferably 40% by weight or more, and is preferably 90% by weight or less, and more preferably 80% by weight or less.

The negative electrode slurry may contain additives, such as a dispersant, that can exhibit a variety of functions. When the negative electrode slurry contains a dispersant, the viscosity of the slurry can be adjusted within a desired range, so that the dispersibility of the non-conductive particles can be increased and the applicability of the slurry can be increased.

As the dispersant, a water-soluble polysaccharide is preferably used. Examples of the polysaccharide may include natural macromolecules and cellulose-based semi-synthetic macromolecules. As the dispersant, one type thereof may be solely used, or two or more types thereof may be used in combination at any ratio.

Examples of the natural macromolecules may include plant- and animal-derived polysaccharides and proteins. In some cases, natural macromolecules that have been subjected to fermentation using, e.g., a microorganism and natural macromolecules that have been subjected heat treatment are also exemplified. These natural macromolecules may be classified into plant-based natural macromolecules, animal-based natural macromolecules, microorganism-based natural macromolecules, etc.

Examples of the plant-based natural macromolecules may include gum arabic, tragacanth, galactan, guar gum, carob gum, karaya gum, carrageenan, pectin, agar, quince seed (marmelo), algae colloid (brown algae extract), starch (derived from rice, corn, potato, wheat, etc.), and glycyrrhizin. Examples of the animal-based natural macromolecules may include collagen, casein, albumin, and gelatin. Examples of the microorganism-based natural macromolecules may include xanthan gum, dextran, succinoglucan, and pullulan.

The cellulose-based semi-synthetic macromolecules may be classified into nonionic, anionic, and cationic cellulose-based semi-synthetic macromolecules.

Examples of the nonionic cellulose-based semi-synthetic macromolecules may include: alkyl celluloses such as methyl cellulose, methyl ethyl cellulose, ethyl cellulose, and microcrystalline cellulose; and hydroxyalkyl celluloses such as hydroxyethyl cellulose, hydroxybutyl methyl cellulose, hydroxypropyl cellulose, hydroxypropyl methyl cellulose, hydroxyethyl methyl cellulose, hydroxypropyl methyl cellulose stearoxy ether, carboxymethyl hydroxyethyl cellulose, alkyl hydroxyethyl cellulose, and nonoxynyl hydroxyethyl cellulose.

Examples of the anionic cellulose-based semi-synthetic macromolecules may include alkyl celluloses obtained by substituting the aforementioned nonionic cellulose-based semi-synthetic macromolecules with a variety of derivative groups, and sodium salts and ammonium salts of the alkyl celluloses. Specific examples thereof may include sodium cellulose sulfate, methyl cellulose, methyl ethyl cellulose, ethyl cellulose, carboxymethyl cellulose (CMC), and salts thereof.

Examples of the cationic cellulose-based semi-synthetic macromolecules may include low-nitrogen hydroxyethyl cellulose dimethyl diallylammonium chloride (polyquaternium-4), O-[2-hydroxy-3-(trimethylammonio)propyl]hydroxyethyl cellulose chloride (polyquaternium-10), and O-[2-hydroxy-3-(lauryldimethylammonio)propyl]hydroxyethyl cellulose chloride (polyquaternium-24).

Of these, cellulose-based semi-synthetic macromolecules, sodium salts thereof, and ammonium salts thereof are preferred because they can have cationic, anionic, or amphoteric property. Of these, anionic cellulose-based semi-synthetic macromolecules are particularly preferred from the viewpoint of the dispersibility of the negative electrode active material.

The degree of etherification of the cellulose-based semi-synthetic macromolecule is preferably 0.5 or higher, and more preferably 0.6 or higher, and is preferably 1.0 or lower, and more preferably 0.8 or lower. The degree of etherification is the degree of substitution of (three) hydroxy groups with substituents such as carboxymethyl groups per one anhydrous glucose unit in the cellulose. Theoretically, the degree of etherification can take a value from 0 to 3. When the degree of etherification is within the aforementioned range, the cellulose-based semi-synthetic macromolecule are adsorbed on the surface of the non-conductive particles and exhibits compatibility with water. Therefore, high dispersibility can be obtained, and the negative electrode active material can be finely dispersed at the primary particle level.

When a macromolecule (including a polymer) is used as the dispersant, it is preferable that the average degree of polymerization of the dispersant calculated from the limiting viscosity determined using an Ubbelohde viscometer falls within a specific range. Specifically, the average degree of polymerization of the dispersant is preferably 500 or higher, and more preferably 1,000 or higher, and is preferably 2,500 or lower, more preferably 2,000 or lower, and particularly preferably 1,500 or lower. The average degree of polymerization of the dispersant may affect the flowability of the slurry, membrane uniformity, and process steps. When the average degree of polymerization is within the aforementioned range, stability with the lapse of time of the slurry is improved, so that the slurry can be applied without coagulation and unevenness in thickness.

The amount of the dispersant based on 100 parts by weight of the negative electrode active material is usually 0.1 parts by weight or more, and preferably 0.2 parts by weight or more, and is usually 10 parts by weight or less, preferably 7 parts by weight or less, and more preferably 5 parts by weight or less. When the amount of the dispersant is within the aforementioned range, the viscosity of the negative electrode slurry can fall within a preferable range in which the slurry can be easily handled. Usually, the dispersant is contained also in the negative electrode active material layer. When the amount of the dispersant is equal to or higher than the lower limit of the aforementioned range, the strength of the negative electrode active material layer can be increased. When the amount of the dispersant is equal to or lower than the upper limit, the flexibility of the negative electrode active material layer can be improved.

The negative electrode slurry may further contain, e.g., trifluoropropylene carbonate, vinylene carbonate, catechol carbonate, 1,6-dioxaspiro[4,4]nonane-2,7-dione, 12-crown-4-ether, etc., in order to improve the stability and life of the battery. These may also be contained in the electrolytic solution. One type thereof may be solely used, or two or more types thereof may be used in combination at any ratio.

The negative electrode slurry may further contain a surfactant such as an alkyl-based surfactant, a silicon-based surfactant, a fluorine-based surfactant, and a metal-based surfactant. When the surfactant is contained, repelling that occurs during application of the slurry can be prevented, and the smoothness of the negative electrode can be improved. Preferably, the amount of the surfactant is within the range in which no influence is exerted on the battery property.

The negative electrode slurry may further contain nanoparticles having a volume average particle diameter of less than 100 nm, such as fumed silica or fumed alumina nanoparticles. When the nanoparticles are contained, the thixotropy of the slurry can be controlled, and the leveling property of the negative electrode active material layer can be improved.

The negative electrode slurry is obtained by mixing the negative electrode active material, the negative electrode polymer, and water, and an optional component added as needed using a mixer. In the mixing, the aforementioned components may be supplied to the mixer at once for mixing, or may be divided into a plurality of parts, supplied to the mixer in any order for mixing. The mixer for use may be, e.g., a ball mill, a sand mill, a pigment disperser, a grinder, an ultrasonic disperser, a homogenizer, a planetary mixer, a Hobart mixer, etc. Of these, a ball mill is preferably used because coagulation of the conducting material and the negative electrode active material can be suppressed.

The size (particle size) of the particles contained in the negative electrode slurry is preferably 35 μm or less and more preferably 25 μm or less. When the particle size of the slurry is within the aforementioned range, the dispersibility of the conducting material is improved, and a uniform negative electrode is obtained.

The aforementioned negative electrode slurry is applied onto at least one surface, preferably both surfaces, of the current collector to form a layer of the negative electrode slurry. Then the formed layer is dried to remove water, whereby a negative electrode active material layer is obtained on the surface of the current collector.

Examples of the method for applying the negative electrode slurry onto the current collector may include a doctor blade method, a dipping method, a reverse roll method, a direct roll method, a gravure method, an extrusion method, and a brush coating method. Examples of the drying method may include: drying using warm air, hot air, or low-moisture air; vacuum drying; and a drying method by irradiation with, e.g., (far-)infrared rays or an electron beam. The conditions for drying may be, e.g., a drying temperature of 120° C. or higher and a drying time of 1 hour or longer.

Then it is preferable to subject the negative electrode active material layer to pressure treatment using, e.g., a die press, a roll press, etc. The pressure treatment can reduce the porosity of the negative electrode active material layer. The porosity is preferably 5% or more, and more preferably 7% or more, and is preferably 15% or less, and more preferably 13% or less. When the porosity is equal to or higher than the lower limit of the aforementioned range, the volume capacity can be increased, and peeling of the negative electrode active material layer can be prevented. When the porosity is equal to or lower than the upper limit of the aforementioned range, charging efficiency and discharging efficiency can be increased.

[5.2. Step of Applying and Drying Porous Membrane Slurry]

For producing the porous membrane, the porous membrane slurry is prepared. The porous membrane slurry is a fluid composition containing the non-conductive particles, the porous membrane polymer that is a non-particulate and cross-linkable polymer, and a solvent, and an optional component used as needed. In the porous membrane slurry, the non-conductive particles are dispersed in the solvent. In the porous membrane slurry, the porous membrane polymer has cross-linkable groups. The polymer in the slurry is in a pre-cross-linked state and is dissolved in the solvent. However, in the porous membrane polymer, part of the cross-linkable groups may be cross-linked, so long as the porous membrane polymer is dissolved in the solvent and capable of maintaining the non-particulate shape.

Examples of the solvent may include: cyclic aliphatic hydrocarbons such as cyclopentane and cyclohexane; aromatic hydrocarbons such as toluene and xylene; ketones such as ethyl methyl ketone and cyclohexanone; esters such as ethyl acetate, butyl acetate, γ-butyrolactone, and ε-caprolactone; acylonitriles such as acetonitrile and propionitrile; ethers such as tetrahydrofuran and ethylene glycol diethyl ether; alcohols such as methanol, ethanol, isopropanol, ethylene glycol, and ethylene glycol monomethyl ether; and amides such as N-methylpyrrolidone and N,N-dimethylformamide.

As the solvent, one type thereof may be solely used, or two or more types thereof may be used in combination at any ratio. It is particularly preferable to use as the solvent a combination of two or more types of solvents. In this case, it is desirable to select the combination of two or more solvents such that the difference in boiling point between the solvents is preferably 40° C. or higher, more preferably 50° C. or higher, and particularly preferably 60° C. or higher. When the difference in boiling point is equal to or higher than the lower limit of the aforementioned range, solvents with different vaporization timings can be used in combination, so that the porosity of the porous membrane can be increased. The difference in boiling point between the solvents is preferably 145° C. or lower, more preferably 140° C. or lower, and particularly preferably 135° C. or lower. When three or more solvents are used, it is preferable that the difference in boiling point between at least two of the solvents is within the aforementioned range.

Usually, the amount of the solvent in the porous membrane slurry may be freely set within the range in which the porous membrane slurry has a viscosity within the range in which workability during production of the porous membrane is not impaired. Specifically, the amount of the solvent is set such that the solid concentration in the porous membrane slurry is usually 5% by weight and preferably 10% by weight or more, and is usually 30% by weight or less and preferably 25% by weight or less.

The porous membrane slurry may contain an optional component. No particular limitation is imposed on the optional component so long as it does not excessively give unfavorably influence to the battery reaction in the secondary battery. Examples of the optional component may include a dispersant, a surfactant, and nanoparticles. The optional component may be of one type or may be two or more types.

No particular limitation is imposed on the method for producing the porous membrane slurry. Usually, the porous membrane slurry is obtained by mixing the aforementioned non-conductive particles, the aforementioned porous membrane polymer, and the aforementioned solvent, and an optional component added as needed. No particular limitation is imposed on the order of mixing. No particular limitation is imposed on the method for mixing. Usually, a disperser is used as a mixing device for rapid dispersion of the non-conductive particles.

The disperser is preferably a device that can uniformly disperse and mix the aforementioned components. Examples of such a device may include a ball mill, a sand mill, a pigment disperser, a grinder, an ultrasonic disperser, a homogenizer, and a planetary mixer. Particularly, a high dispersing device such as a bead mill, a roll mill, or a Filmix is particularly preferred because high dispersing shear can be applied.

After the porous membrane slurry is prepared, the porous membrane slurry is applied onto the negative electrode active material layer to obtain a porous membrane slurry layer. Examples of the method for applying the porous membrane slurry may include a doctor blade method, a dipping method, a reverse roll method, a direct roll method, a gravure method, an extrusion method, and a brush coating method. Of these, a dipping method and a gravure method are preferred because a uniform porous membrane can thereby be obtained.

Then the porous membrane slurry layer is dried to remove the solvent, whereby a layer containing the non-conductive particles and the porous membrane polymer is obtained. Examples of the drying method may include: drying using warm air, hot air, or low-moisture air; vacuum drying; and a drying method by irradiation with, e.g., (far-)infrared rays or an electron beam. The drying temperature is set to a temperature at which the solvent is vaporized and removed from the coating. Usually, the drying is performed at 40° C. or higher.

[5.3. Cross-linking Step]

After the layer containing the non-conductive particles and the porous membrane polymer is formed on the negative electrode active material layer, the formed layer is heated to cross-link the porous membrane polymer. The non-conductive particles are thereby bound via the cross-linked porous membrane polymer, whereby a porous membrane is obtained. In this manner, the negative electrode of the present invention that includes the current collector, the negative electrode active material layer, and the porous membrane in this order is obtained.

The cross-linking temperature is preferably 110° C. or higher, more preferably 130° C. or higher, and particularly preferably 150° C. or higher, and is preferably 200° C. or lower, more preferably 195° C. or lower, and particularly preferably 190° C. or lower. When the cross-linking temperature is equal to or higher than the lower limit of the aforementioned range, the cross-linking reaction proceeds sufficiently, so that the membrane strength of the porous membrane can be effectively increased. When the cross-linking temperature is equal to or lower than the upper limit, decomposition of the porous membrane polymer can be suppressed.

The step of drying the porous membrane slurry layer and the step of cross-linking the porous membrane polymer may be simultaneously performed. Specifically, drying may be performed at a temperature high enough to effect cross-linking of the porous membrane polymer. In this manner, the number of steps can be reduced to improve the efficiency of production.

When the porous membrane is produced, an additional step may be performed in addition to the aforementioned steps. For example, pressure treatment using a die press, a roll press, etc. may be performed. The pressure treatment can improve the binding property between the porous membrane and the negative electrode active material layer. However, when the pressure treatment is excessively performed, the porosity of the porous membrane may be impaired. Therefore, it is preferable to appropriately control the pressure and pressurization time.

[6. Secondary Battery]

Usually, the secondary battery including the negative electrode of the present invention includes a positive electrode, the negative electrode, an electrolytic solution, and a separator. In this case, as the negative electrode, the negative electrode of the present invention is used. Since the negative electrode of the present invention is provided, this secondary battery has excellent cycle property and high reliability.

[6.1. Positive Electrode]

The positive electrode usually includes a current collector and a positive electrode active material layer that is formed on the surface of the current collector and contains a positive electrode active material and a binder for the positive electrode. Alternatively, a metal may be used as the positive electrode active material which may also serve as the current collector.

No particular limitation is imposed on the material of the current collector of the positive electrode, so long as the material has electric conductivity and electrochemical durability. The current collector of the positive electrode may be, e.g., the same current collector as that used for the negative electrode of the present invention. Aluminum is particularly preferable.

When the secondary battery is, e.g., a lithium ion secondary battery, a material that can be intercalated and deintercalated with lithium ions is used as the positive electrode active material. Such positive electrode active materials are broadly classified into materials composed of inorganic compounds and materials composed of organic compounds.

Examples of the positive electrode active material composed of an inorganic compound may include transition metal oxides, transition metal sulfides, and lithium-containing complex metal oxides formed from lithium and transition metals.

Examples of the transition metals may include Ti, V, Cr, Mn, Fe, Co, Ni, Cu, and Mo.

Examples of the transition metal oxides may include MnO, $MnO_2$, $V_2O_5$, $V_6O_{13}$, $TiO_2$, $Cu_2V_2O_3$, amorphous $V_2O$—$P_2O_5$, $MoO_3$, $V_2O_5$, and $V_6O_{13}$. Of these, MnO, $V_2O_5$, $V_6O_{13}$, and $TiO_2$ are preferred in terms of cycle stability and capacity.

Examples of the transition metal sulfides may include $TiS_2$, $TiS_3$, amorphous $MoS_2$, and FeS.

Examples of the lithium-containing complex metal oxides may include lithium-containing complex metal oxides having a layered structure, lithium-containing complex metal oxides having a spinel structure, and lithium-containing complex metal oxides having an olivine-type structure.

Examples of the lithium-containing complex metal oxides having a layered structure may include lithium-containing cobalt oxide ($LiCoO_2$), lithium-containing nickel oxide ($LiNiO_2$), lithium complex oxide of Co—Ni—Mn, lithium complex oxide of Ni—Mn—Al, and lithium complex oxide of Ni—Co—Al.

Examples of the lithium-containing complex metal oxides having a spinel structure may include lithium manganate ($LiMn_2O_4$) and $Li[Mn_{3/2}M_{1/2}]O_4$ obtained by substituting part of Mn with another transition metal (wherein M is Cr, Fe, Co, Ni, Cu, etc.).

Examples of the lithium-containing complex metal oxides having an olivine-type structure may include olivine-type lithium phosphate compounds represented by $Li_xMPO_4$ (wherein M is at least one selected from the group consisting of Mn, Fe, Co, Ni, Cu, Mg, Zn, V, Ca, Sr, Ba, Ti, Al, Si, B, and Mo, and x is a number satisfying $0 \leq x \leq 2$).

Examples of the positive electrode active material composed of an organic compound may include conductive macromolecular compounds such as polyacetylene and poly-p-phenylene.

A positive electrode active material composed of a composite material including a combination of an inorganic compound and an organic compound may also be used. For example, an iron-based oxide is subjected to reduction-firing in the presence of a carbon source material to produce a composite material covered with the carbon material, and this composite material may be used as the positive electrode active material. Although the iron-based oxide tends to have low electric conductivity, when the iron-based oxide is processed to be such a composite material, it can be used as a high-performance positive electrode active material.

A compound obtained by partially substituting an element in any of the aforementioned compounds with another element may also be used as the positive electrode active material. A mixture of any of the aforementioned inorganic compounds and any of the aforementioned organic compounds may also be used as the positive electrode active material.

As the positive electrode active material, one type thereof may be solely used, or two or more types thereof may be used in combination at any ratio.

The average particle diameter of the particles of the positive electrode active material is usually 1 µm or more, and preferably 2 µm or more, and is usually 50 µm or less, and preferably 30 µm or less. When the average particle diameter of the particles of the positive electrode active material is within the aforementioned range, the amount of the binder used when the positive electrode active material layer is prepared can be reduced, and a reduction in capacity of the secondary battery can be suppressed. Usually, for forming the positive electrode active material layer, a positive electrode slurry containing the positive electrode active material and the binder is prepared. The viscosity of the positive electrode slurry can be easily adjusted to an appropriate viscosity suitable for application, and a uniform positive electrode can thereby be obtained.

The content ratio of the positive electrode active material in the positive electrode active material layer is preferably 90% by weight or more, and more preferably 95% by weight or more, and is preferably 99.9% by weight or less, and more preferably 99% by weight or less. When the content of the positive electrode active material is within the aforementioned range, the capacity of the secondary battery can be increased, and the flexibility of the positive electrode and the binding property between the positive electrode active material layer and the current collector can be improved.

Examples of the binder for the positive electrode may include: resins such as polyethylene, polytetrafluoroethylene (PTFE), polyvinylidene fluoride (PVDF), a tetrafluoroethylene-hexafluoropropylene copolymer (FEP), polyacrylic acid derivatives, and polyacrylonitrile derivatives; and soft polymers such as acrylic-based soft polymers, diene-based soft polymers, olefin-based soft polymers, and vinyl-based soft polymers. As the binder, one type thereof may be solely used, or two or more types thereof may be used in combination at any ratio.

If necessary, the positive electrode active material layer may contain a component other than the positive electrode active material and the binder. Examples of such a component may include a viscosity modifier, a conducting agent, a reinforcing material, a leveling agent, and an electrolyte additive. As these components, one type thereof may be solely used, or two or more types thereof may be used in combination at any ratio.

The thickness of the positive electrode active material layer is usually 5 µm or more, and preferably 10 µm or more, and is usually 300 µm or less, and preferably 250 µm or less. When the thickness of the positive electrode active material layer is within the aforementioned range, both high load property and high energy density can be achieved.

[6.2. Electrolytic Solution]

As the electrolytic solution, e.g., an electrolytic solution prepared by dissolving a lithium salt serving as a supporting electrolyte in a non-aqueous solvent may be used. Examples of the lithium salt may include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Particularly, $LiPF_6$, $LiClO_4$, and $CF_3SO_3Li$ are preferably used because they are easily dissolved in the solvent and have high dissociation degree. One type thereof may be solely used, or two or more types thereof may be used in combination at any ratio.

The amount of the supporting electrolyte with respect to the electrolytic solution is usually 1% by weight or more, and preferably 5% by weight or more, and is usually 30% by weight or less, and preferably 20% by weight or less. If the amount of the supporting electrolyte is too large or too small, ionic conductivity may decrease, and the charging property and discharging property of the secondary battery may decrease.

No particular limitation is imposed on the solvent for the electrolytic solution, so long as it can dissolve the supporting electrolyte. Examples of the solvent for use may include: alkyl carbonates such as dimethyl carbonate (DMC), ethylene carbonate (EC), diethyl carbonate (DEC), propylene carbonate (PC), butylene carbonate (BC), and methyl ethyl carbonate (MEC); esters such as γ-butyrolactone and methyl formate; ethers such as 1,2-dimethoxyethane and tetrahydrofuran; and sulfur-containing compounds such as sulfolane and dimethyl sulfoxide. Particularly, dimethyl carbonate, ethylene carbonate, propylene carbonate, diethyl carbonate, and methyl ethyl carbonate are preferred because high ionic conductivity can be easily obtained and the range of usable temperature is wide. As the solvent, one type thereof may be solely used, or two or more types thereof may be used in combination at any ratio.

If necessary, the electrolytic solution may contain an additive. The additive is preferably a carbonate-based compound such as vinylene carbonate (VC). As the additive, one type thereof may be solely used, or two or more types thereof may be used in combination at any ratio.

Examples of the electrolytic solution other than those may include: gel polymer electrolytes prepared by impregnating polymer electrolytes such as polyethylene oxide and polyacrylonitrile with an electrolytic solution; and inorganic solid electrolytes such as lithium sulfide, LiI, and $Li_3N$.

[6.3. Separator]

As the separator, a porous substrate having pore portions is usually used. Examples of the separator may include (a) a porous separator having pore portions, (b) a porous separator having a macromolecular coating layer formed on one surface or both surfaces, and (c) a porous separator having formed thereon a porous resin coating layer including inorganic ceramic powders. Examples of such separators may include: polypropylene-based, polyethylene-based, polyolefin-based, and aramid-based porous separators; macromolecular films for solid polymer electrolytes and gel polymer electrolytes such as films of polyvinylidene fluoride, polyethylene oxide, polyacrylonitrile, and a polyvinylidene fluoride hexafluoropropylene copolymer; separators coated with a gelated macromolecular coating layer; and separators coated with a porous membrane layer formed of an inorganic filler and a dispersant for the inorganic filler.

[6.4. Method for Producing Secondary Battery]

No particular limitation is imposed on the method for producing the secondary battery. For example, the negative electrode and positive electrode described above are stacked via a separator. If necessary, the stacked body is, e.g., wound or folded in accordance with the battery shape. The resultant stacked body is placed in a battery container. Then the electrolytic solution is poured into the battery container, and the container is sealed, whereby a battery is formed. If necessary, expanded metal, an overcurrent protective element such as a fuse or a PTC element, a lead plate, etc. may be placed in the battery to prevent a pressure increase inside the battery and overcharging/overdischarging. The shape of the battery may be, e.g., any of a laminated cell type, a coin type, a button type, a sheet type, a cylinder type, a rectangular shape, a flat type, etc.

EXAMPLES

In the following, the present invention will be specifically described by way of Examples. However, the present invention is not limited to the following Examples and may be implemented with any modifications without departing from the scope of the claims and equivalents thereto. Unless otherwise specified, "part" and "%" representing an amount in the following description, are based on weight. Unless otherwise specified, the following operations were performed under the conditions of room temperature and normal pressure.

[Evaluation Methods]

[Method for Calculating Number Average Particle Diameter and Variation Coefficient in Particle Diameter]

A photograph of particles was taken at a magnification of 25,000 with a field emission scanning electron microscope ("Hitachi S-4700", manufactured by Hitachi High-Technologies Corporation), from which 200 particles were randomly selected. The diameter of the particle was defined as $(La+Lb)/2$ wherein La is the longest axis and Lb is the shortest axis of each particle image. The number average particle diameter was calculated as the average of the particle diameters of the 200 particles. The variation coefficient in particle diameter was calculated from the number average particle diameter and the standard deviation.

[Method for Measuring Softening Starting Point]

10 mg of a measurement sample was weighed into an aluminum pan. With an empty aluminum pan used as a reference, a DSC curve was measured at room temperature and room humidity using a differential thermal analysis apparatus ("EXSTAR DSC6220", manufactured by SII NanoTechnology Inc.) with a measurement temperature range of −100° C. to 500° C. in a nitrogen atmosphere at a temperature rising rate of 10° C./min. In this heating process, a temperature higher by 25° C. than a temperature at the intersection of a base line immediately before the onset of an endothermic peak in the DSC curve at which a differential signal (DDSC) was 0.05 mW/min/mg or higher and the tangent line of the DSC curve at a first inflection point after the onset of the endothermic peak was taken as the softening starting point.

[Method for Measuring Decomposition Point]

A sample was heated in a nitrogen atmosphere from 30° C. at a temperature rising rate of 10° C./min using a thermogravimetry/differential thermal analyzer ("EXSTAR TG/DTA6000", manufactured by SII NanoTechnology Inc.), and a temperature at which the ratio of weight reduction became 10% by weight was used as the decomposition point.

[Evaluation Test for Rate Property of the Secondary Battery]

In an environment of 25° C., a laminated-type lithium ion secondary battery was left to stand for 24 hours and then subjected to charging-discharging operation at 4.2V and a charging-discharging rate of 0.1 C. Then (i) a charging-discharging cycle at 25° C. in which the battery was charged to 4.2 V and a charging rate of 0.1 C and then discharged to 3.0 V at a discharging rate of 1.0 C and (ii) a charging-discharging cycle at 25° C. in which the battery was charged to 4.2 V and a charging rate of 0.1 C and then discharged to 3.0 V at a discharging rate of 3.0 C were each performed. The ratio of the battery capacity at 3.0 C with respect to the battery capacity at 1.0 C was calculated in percentage and taken as charging-discharging rate property, and the charging-discharging rate property was evaluated in accordance with the following criteria. Higher value is indicative of lower internal resistance and capability for performing faster charging and discharging.

(Evaluation Criteria)
A: 70% or more
B: 65% or more and less than 70%
C: 60% or more and less than 65%
D: less than 60%

[Evaluation Test for High-Temperature Cycle Property of the Secondary Battery]

In an environment of 25° C., a laminated-type lithium ion secondary battery was left to stand for 24 hours, and then a charging-discharging operation was performed at a charging-discharging rate of 0.1 C and 4.2 V, to measure an initial capacity C0. Then charging and discharging were repeated in an environment of 60° C. in cycles wherein the cycle was charging to 4.2 V and discharging to 3.0 V at a charging-discharging rate of 0.1 C, and a capacity C1 after 100 cycles was measured. The high-temperature cycle property was evaluated using a capacity retention rate $\Delta C$ represented by $\Delta C = C1/C0 \times 100 (\%)$. Higher value is indicative of lower reduction in discharging capacity, and better cycle property.

(Evaluation Criteria)
A: 80% or more
B: 75% or more and less than 80%
C: 70% or more and less than 75%
D: less than 70%

[Reliability Test for the Secondary Battery]

In an environment of 25° C., a laminated-type lithium ion secondary battery was left to stand for 24 hours, and then a charging-discharging operation was performed at a charging-discharging rate of 0.1 C and 4.2 V, and the battery was charged to 4.2 V at a charging rate of 0.1 C. This battery was placed in a constant temperature bath. The battery was heated to 150° C. at 5° C./min, and left to stand at 150° C. for 1 hour. Then the occurrence of a short circuit in each battery was checked. The battery with no short circuit is a battery having high reliability.

(Evaluation Criteria)
Good: No short circuit occurred.
Bad: A short circuit occurred.

Example 1

1-1. Production of Seed Polymer Particles S1

In a reaction vessel equipped with a stirrer, 0.06 parts of sodium dodecyl sulfate, 0.2 parts of ammonium persulfate, and 100 parts of ion exchanged water were placed. These components were mixed to prepare a mixture A1. Then the mixture A1 was heated to 80° C.

In a separate vessel, 98 parts of butyl acrylate and 2.0 parts of methacrylic acid as monomers, 0.1 parts of sodium dodecyl sulfate, and 100 parts of ion exchanged water were mixed to prepare a dispersion of a monomer mixture M1.

The dispersion of the monomer mixture M1 was continuously added to the mixture A1 over 4 hours to polymerize the monomers. During the continuous addition of the dispersion of the monomer mixture M1, the temperature of the reaction system was maintained at 80° C. to perform the reaction. After completion of the continuous addition, the reaction was further continued at 90° C. for 3 hours.

A water dispersion of seed polymer particles S1 having a number average particle diameter of 360 nm was thereby obtained.

1-2. Production of Non-Conductive Particles P1

Subsequently, in a reaction vessel equipped with a stirrer, 20 parts based on solid content (i.e., based on the weight of the seed polymer particles S1) of the water dispersion of the seed polymer particles S1 obtained in step (1-1), 99 parts of ethylene glycol dimethacrylate ("Light Ester EG", KYOEISHA CHEMICAL Co., Ltd.) and 1.0 part of acrylic acid as monomers, 1.0 part of sodium dodecylbenzene sulfonate as an emulsifier, 4.0 parts of t-butylperoxy-2-ethylhexanoate ("PERBUTYL O", NOF CORPORATION) as a polymerization initiator, and 200 parts of ion exchanged water were placed. The mixture was stirred at 35° C. for 12 hours to cause the monomers and the polymerization initiator to be completely absorbed into the seed polymer particles S1. Then the monomers were polymerized at 90° C. for 5 hours. Then steam was introduced to remove the unreacted monomers and a decomposition product of the initiator. Further, 200 parts of N-methyl-2-pyrrolidone (NMP) was added, and the resultant mixture was sufficiently stirred. Then water was removed in a reduced pressure environment at 90° C. An NMP dispersion containing non-conductive particles P1 having a number average particle diameter of 650 nm was thereby obtained.

1-3. Production of Porous Membrane Polymer

In a reaction vessel equipped with a stirrer, 0.5 parts of sodium dodecylbenzene sulfonate, 1.0 part of potassium persulfate, 80 parts of ethyl acrylate, 15 parts of acrylonitrile and 5 parts of allyl glycidyl ether as monomers, and 200 parts of ion exchanged water were placed, and these components were mixed. The monomers were polymerized at 80° C. for 5 hours. Then steam was introduced to remove the unreacted monomers. Further, 400 parts of NMP was added, and the resultant mixture was stirred sufficiently. Then water was removed in a reduced pressure environment at 90° C. An NMP solution containing a cross-likable porous membrane polymer B1 was thereby obtained.

1-4. Production of Negative Electrode Polymer

In a reaction vessel equipped with a stirrer, 4 parts of sodium dodecylbenzene sulfonate, 0.5 parts of potassium persulfate, 33 parts of 1,3-butadiene, 63.5 parts of styrene and 3.5 parts of itaconic acid as monomers, and 200 parts of ion exchanged water were placed. These components were then mixed. The monomers were polymerized at 50° C. for 12 hours. Then steam was introduced to remove the unreacted monomers. A water dispersion containing a particulate negative electrode polymer was thereby obtained.

1-5. Production of Porous Membrane Slurry

The NMP dispersion containing the non-conductive particles P1 obtained in step (1-2) and the NMP solution containing the porous membrane polymer B1 obtained in step (1-3) were mixed at a ratio of 87:13 based on the solid content weight to thereby obtain a mixture with a solid content concentration of 18%. Further, 5 parts of ethanol as a solvent was added to 100 parts of the aforementioned mixture, and the resultant mixture was sufficiently stirred to obtain a porous membrane slurry.

1-6. Production of Negative Electrode Slurry

In a planetary mixer equipped with a disper blade, 70 parts of artificial graphite (volume average particle diameter: 24.5 μm) having a specific surface area of 4 m²/g and 30 parts of $SiO_x$ (manufactured by Shin-Etsu Chemical Co., Ltd., volume average particle diameter: 5 μm) as negative electrode active materials, and 1 part based on solid content of a 1% aqueous solution of carboxymethyl cellulose ("BSH-12", manufactured by DAI-ICHI KOGYO SEI-YAKU Co., Ltd.) as a dispersant were placed. Then the solid content concentration was adjusted to 55% with ion exchanged water. Then these components were mixed at 25° C. for 60 hours. Subsequently, the solid content concentration was adjusted to 52% with ion exchanged water. Then the mixture was further stirred at 25° C. for 15 minutes to obtain a mixed solution.

1.0 Part by weight based on solid content of the water dispersion containing the negative electrode polymer obtained in step (1-4) was added to the aforementioned mixed solution, and ion exchanged water was added to adjust the concentration so that the final solid content concentration became 50%. The mixture was further stirred for 10 minutes. The resultant mixture was subjected to degassing under reduced pressure to thereby obtain a negative electrode slurry having high flowability.

1-7. Production of Negative Electrode

The negative electrode slurry obtained in step (1-6) was applied onto a 20 μm-thick copper foil as a current collector using a comma coater so as to adjust the dry thickness of about 150 μm. The slurry was then dried. The drying was performed by conveying the copper foil through an oven at 60° C. at a rate of 0.5 m/min over 2 minutes. Then heat treatment was performed at 120° C. for 2 minutes to thereby obtain a raw negative electrode sheet. The raw negative electrode sheet was rolled using a roll press to obtain a negative electrode with an 80 μm-thick negative electrode active material layer.

1-8. Production of Negative Electrode with Porous Membrane

The porous membrane slurry obtained in step (1-5) was applied onto the surface of the negative electrode active material layer of the negative electrode obtained in step (1-7) such that the negative electrode active material layer was fully covered therewith and the dry thickness of the porous membrane was adjusted to 5 μm, to thereby obtain a slurry layer. The slurry layer was dried at 80° C. for 10 minutes to remove the solvent and then heated at 180° C. for 10 minutes to effect the cross-linking reaction of the porous membrane polymer, whereby a porous membrane was formed. In this manner, a negative electrode with the porous membrane was obtained. The obtained negative electrode with the porous membrane included the porous membrane, the negative electrode active material layer, and the copper foil in this order.

1-9. Production of Positive Electrode

To 95 parts of $LiCoO_2$ as a positive electrode active material, PVDF (polyvinylidene fluoride, product name: KF-1100, manufactured by KUREHA CORPORATION) as a binder was added in an amount of 3 parts based on solid content. Then 2 parts of acetylene black as a conducting material and 20 parts of N-methylpyrrolidone as a solvent were added, and these components were mixed using a planetary mixer to obtain a positive electrode slurry. This positive electrode slurry was applied onto one surface of a 18 μm-thick aluminum foil using a comma coater. The application was performed by conveying the aluminum foil through an oven at 60° C. at a rate of 0.5 m/min over 2 minutes. Then the aluminum foil was dried at 120° C. for 2 hours. The resultant aluminum foil was roll-pressed to thereby obtain a positive electrode including a positive electrode mixture layer and having a total thickness of 100 μm.

1-10. Production of Secondary Battery

The positive electrode obtained in step (1-9) was cut into a piece of 40 mm width×40 mm length to obtain a square positive electrode. The negative electrode with the porous membrane obtained in step (1-8) was cut into a piece of 42 mm width×42 mm length to obtain a square negative electrode. A single layer polyethylene-made separator (thickness: 16 μm) produced by a wet method was prepared as an organic separator, and the organic separator was cut into a piece of 46 mm width×46 mm length to obtain a square separator.

The square separator was placed on the surface of the positive electrode active material layer of the square positive electrode. Then the square negative electrode was placed on the separator such that the surface of the porous membrane faced the separator. A stacked body including the positive electrode, the separator, and the negative electrode in this order was thereby obtained.

The stacked body was placed in an aluminum package. An electrolytic solution was poured into the aluminum package such that no air remained. Heat sealing was performed at 150° C. to seal the opening of the aluminum package, whereby a laminated-type lithium ion secondary battery was produced. The electrolytic solution was prepared by adding 2% by volume of vinylene carbonate (VC) to a 1.0M $LiPF_6$ solution. As the solvent for the $LiPF_6$ solution, a solvent mixture of ethylene carbonate (EC) and diethyl carbonate (DEC) at a volume ratio of EC/DEC=1/2 was used.

The rate property, high-temperature cycle property, and reliability of the thus-produced lithium ion secondary battery were evaluated in the aforementioned manner.

Example 2

A lithium ion secondary battery was produced and evaluated in the same manner as in Example 1 except that, in the step (1-2), the amount of ethylene glycol dimethacrylate was changed to 69.0 parts and 30.0 parts of divinylbenzene as a monomer was further added to the reaction vessel.

Example 3

A lithium ion secondary battery was produced and evaluated in the same manner as in Example 1 except that, in the step (1-2), the amount of ethylene glycol dimethacrylate was changed to 44.0 parts and 55.0 parts of divinylbenzene as a monomer was further added to the reaction vessel.

Example 4

A lithium ion secondary battery was produced and evaluated in the same manner as in Example 1 except that, in the step (1-3), the amount of allyl glycidyl ether was changed to 3.0 parts, 2.0 parts of 2-acrylamide-2-methylpropanesulfonic acid as a monomer was further added to the reaction vessel, and 0.3 parts of 2,2'-azobis{2-methyl-N-[1.1-bis (hydroxymethyl)-2-hydroxyethyl]propionamide} ("VA-080" manufactured by Wako Pure Chemical Industries, Ltd.) was used as the initiator in place of potassium persulfate.

Example 5

A lithium ion secondary battery was produced and evaluated in the same manner as in Example 1 except that, in the step (1-3), 5.0 parts of glycidyl methacrylate was used in place of allyl glycidyl ether.

Example 6

A lithium ion secondary battery was produced and evaluated in the same manner as in Example 1 except that, in the step (1-3), the amount of allyl glycidyl ether was changed to 3.0 parts, 2.0 parts of acrylic acid as a monomer was further added to the reaction vessel, and 0.3 parts of 2,2'-azobis{2-methyl-N-[1.1-bis(hydroxymethyl)-2-hydroxyethyl]propionamide} ("VA-080" manufactured by Wako Pure Chemical Industries, Ltd.) was used as the initiator in place of potassium persulfate.

Example 7

A lithium ion secondary battery was produced and evaluated in the same manner as in Example 1 except that, in the step (1-1), the amount of sodium dodecyl sulfate placed in the reaction vessel equipped with the stirrer was changed to 0.8 parts and the amount of sodium dodecyl sulfate pre-mixed with the monomers in a vessel different from the reaction vessel was changed to 1.2 parts to thereby change the total amount of sodium dodecyl sulfate to 2.0 parts.

Example 8

In the step (1-1), the amount of sodium dodecyl sulfate placed in the reaction vessel equipped with the stirrer was changed to 0.03 parts, and the amount of sodium dodecyl sulfate pre-mixed with the monomers in a vessel different from the reaction vessel was changed to 0.05 parts to thereby change the total amount of sodium dodecyl sulfate to 0.08 parts.

In addition, in the step (1-2), the amount of the water dispersion of the seed polymer particles was changed to 4.2 parts based on solid content.

A lithium ion secondary battery was produced and evaluated in the same manner as in Example 1 except for the aforementioned changes.

Example 9

A lithium ion secondary battery was produced and evaluated in the same manner as in Example 1 except that, in the step (1-2), 1.0 part of ammonium persulfate was used as the polymerization initiator in place of t-butylperoxy-2-ethylhexanoate.

Example 10

A lithium ion secondary battery was produced and evaluated in the same manner as in Example 1 except that, in the step (1-6), 30 parts of SiOC (manufactured by Dow Corning Toray Co., Ltd., volume average particle diameter: 10 μm) was used in place of $SiO_x$.

Example 11

A lithium ion secondary battery was produced and evaluated in the same manner as in Example 1 except that, in the step (1-6), 30 parts of SiC (manufactured by Nippon Carbon CO., Ltd., volume average particle diameter: 10 μm) was used in place of $SiO_x$.

Example 12

In the step (1-2), the amount of ethylene glycol dimethacrylate was changed to 49.0 parts, and 50.0 parts of methyl methacrylate as a monomer was further added to the reaction vessel. A lithium ion secondary battery was produced and evaluated in the same manner as in Example 1 except for the aforementioned changes.

Example 13

In the step (1-2), 0.5 parts of ammonium persulfate was used as the polymerization initiator in place of t-butylperoxy-2-ethylhexanoate. A lithium ion secondary battery was produced and evaluated in the same manner as in Example 1 except for the aforementioned change.

Example 14

In the step (1-5), 5 parts of cyclohexanone was used in place of ethanol. A lithium ion secondary battery was produced and evaluated in the same manner as in Example 1 except for the aforementioned change.

Example 15

In the step (1-2), the amount of ethylene glycol dimethacrylate was changed to 69.0 parts, and 30.0 parts of methyl methacrylate as a monomer was further added to the reaction vessel. A lithium ion secondary battery was produced and evaluated in the same manner as in Example 1 except for the aforementioned changes.

Comparative Example 1

In the step (1-2), the reaction solution obtained by introducing steam into the reaction vessel after polymerization to remove the unreacted portion of the monomers and the decomposition product of the initiator was not subjected to solvent replacement with N-methyl-2-pyrrolidone. Accordingly, a water dispersion containing the non-conductive particles was used in the step (1-5) in place of the NMP dispersion containing the non-conductive particles.

In the step (1-3), the reaction solution obtained by introducing steam into the reaction vessel after polymerization to remove the unreacted portion of the monomers was not subjected to solvent replacement with N-methyl-2-pyrrolidone. Accordingly, a water dispersion containing the particulate porous membrane polymer was used in the step (1-5) in place of the NMP solution containing the porous membrane polymer.

In the step (1-6), polyvinylidene fluoride was used in an amount of 2.0 parts based on solid content in place of the water dispersion containing the negative electrode polymer obtained in step (1-4).

A lithium ion secondary battery was produced and evaluated in the same manner as in Example 1 except for the aforementioned changes.

Comparative Example 2

A lithium ion secondary battery was produced and evaluated in the same manner as in Example 1 except that, in the step (1-2), the amount of ethylene glycol dimethacrylate was changed to 29.0 parts and 70.0 parts of divinylbenzene as a monomer was further added to the reaction vessel.

Comparative Example 3

A lithium ion secondary battery was produced and evaluated in the same manner as in Example 1 except that, in the step (1-6), alumina particles (number average particle diameter: 550 nm) were used in place of the non-conductive particles P1.

Comparative Example 4

A lithium ion secondary battery was produced and evaluated in the same manner as in Example 1 except that, in the step (1-2), 99.0 parts of methyl methacrylate was used in place of ethylene glycol dimethacrylate.

Comparative Example 5

A lithium ion secondary battery was produced and evaluated in the same manner as in Example 1 except that, in the step (1-3), the amount of ethyl acrylate was changed to 85.0 parts and allyl glycidyl ether was not used.

Potassium persulfate was used as a polymerization catalyst, and the polymer contained cross-linkable groups. However, the cross-linking reaction did not proceed under these conditions.

[Configurations of Non-conductive Particles and Polymers]

The configurations of the non-conductive particles, porous membrane polymers, and negative electrode polymers in Examples and Comparative Examples are shown in the following Tables 1 to 3.

In the following tables, the meanings of abbreviations are as follows.

BA: butyl acrylate
MAA: methacrylic acid
SDS: sodium dodecyl sulfate
APS: ammonium persulfate
EGDMA: ethylene glycol dimethacrylate
DVB: divinylbenzene
MMA: methyl methacrylate
AA: acrylic acid
LASNa: sodium dodecylbenzene sulfonate
PBO: t-butylperoxy-2-ethylhexanoate
EA: ethyl acrylate
AN: acrylonitrile
AGE: allyl glycidyl ether
GMA: glycidyl methacrylate
AMPS: 2-acrylamide-2-methylpropanesulfonic acid
KPS: potassium persulfate
VA-080: 2,2'-azobis{2-methyl-N-[1.1-bis(hydroxymethyl)-2-hydroxyethyl]propionamide}
ST: styrene
BD: 1,3-butadiene
IA: itaconic acid
NMP replacement step: whether solvent replacement with NMP was performed or not performed
SBR: styrene-butadiene rubber
PVDF: polyvinylidene fluoride
EtOH: ethanol

TABLE 1

[Configuration of non-conductive particles and polymer in Example 1 to Example 6]

| | Ex. 1 | Ex. 2 | Ex. 3 | Ex. 4 | Ex. 5 | Ex. 6 |
|---|---|---|---|---|---|---|
| Seed particle | S1 | S1 | S1 | S1 | S1 | S1 |
| BA (parts) | 98 | 98 | 98 | 98 | 98 | 98 |
| MAA (parts) | 2 | 2 | 2 | 2 | 2 | 2 |
| SDS (parts) | 0.16 | 0.16 | 0.16 | 0.16 | 0.16 | 0.16 |
| APS (parts) | 0.2 | 0.2 | 0.2 | 0.2 | 0.2 | 0.2 |
| (Meth)acrylate ratio (%) | 98 | 98 | 98 | 98 | 98 | 98 |
| Number average particle diameter (nm) | 360 | 360 | 360 | 360 | 360 | 360 |
| Non-conductive particle | P1 | P2 | P3 | P1 | P1 | P1 |
| Seed particle (parts) | 20.0 | 20.0 | 20.0 | 20.0 | 20.0 | 20.0 |
| EGDMA (parts) | 99.0 | 69.0 | 44.0 | 99.0 | 99.0 | 99.0 |
| DVB (parts) | | 30.0 | 55.0 | | | |
| MMA (parts) | | | | | | |
| AA (parts) | 1.0 | 1.0 | 1.0 | 1.0 | 1.0 | 1.0 |
| LASNa (parts) | 1.0 | 1.0 | 1.0 | 1.0 | 1.0 | 1.0 |
| PBO (parts) | 4.0 | 4.0 | 4.0 | 4.0 | 4.0 | 4.0 |
| APS (parts) | | | | | | |
| (Meth)acrylate ratio (%) | 98.8 | 73.8 | 53.0 | 98.8 | 98.8 | 98.8 |
| Number average particle diameter (nm) | 650 | 650 | 650 | 650 | 650 | 650 |
| NMP replacement step | Yes | Yes | Yes | Yes | Yes | Yes |
| Porous membrane polymer | B1 | B1 | B1 | B4 | B5 | B6 |
| EA (parts) | 80.0 | 80.0 | 80.0 | 80.0 | 80.0 | 80.0 |
| AN (parts) | 15.0 | 15.0 | 15.0 | 15.0 | 15.0 | 15.0 |
| AGE (parts) | 5.0 | 5.0 | 5.0 | 3.0 | | 3.0 |
| GMA (parts) | | | | | 5.0 | |
| AMPS (parts) | | | | 2.0 | | |
| AA (parts) | | | | | | 2.0 |
| KPS (parts) | 1.0 | 1.0 | 1.0 | | 1.0 | |
| VA-080 (parts) | | | | 0.3 | | 0.3 |
| LASNa (parts) | 0.5 | 0.5 | 0.5 | 0.5 | 0.5 | 0.5 |
| NMP replacement step | Yes | Yes | Yes | Yes | Yes | Yes |
| Negative electrode polymer | SBR | SBR | SBR | SBR | SBR | SBR |
| ST (parts) | 63.5 | 63.5 | 63.5 | 63.5 | 63.5 | 63.5 |
| BD (parts) | 33.0 | 33.0 | 33.0 | 33.0 | 33.0 | 33.0 |
| IA (parts) | 3.5 | 3.5 | 3.5 | 3.5 | 3.5 | 3.5 |
| KPS (parts) | 0.5 | 0.5 | 0.5 | 0.5 | 0.5 | 0.5 |
| LASNa (parts) | 4.0 | 4.0 | 4.0 | 4.0 | 4.0 | 4.0 |

TABLE 2

[Configuration of non-conductive particles and polymer in Example 7 to Example 11]

| | Ex. 7 | Ex. 8 | Ex. 9 | Ex. 10 | Ex. 11 |
|---|---|---|---|---|---|
| Seed particle | S7 | S8 | S1 | S1 | S1 |
| BA (parts) | 98 | 98 | 98 | 98 | 98 |
| MAA (parts) | 2 | 2 | 2 | 2 | 2 |
| SDS (parts) | 2.0 | 0.08 | 0.16 | 0.16 | 0.16 |
| APS (parts) | 0.2 | 0.2 | 0.2 | 0.2 | 0.2 |
| (Meth)acrylate ratio (%) | 98 | 98 | 98 | 98 | 98 |
| Number average particle diameter (nm) | 83 | 720 | 360 | 360 | 360 |
| Non-conductive particle | P7 | P8 | P9 | P1 | P1 |
| Seed particle (parts) | 20.0 | 4.2 | 20.0 | 20.0 | 20.0 |
| EGDMA (parts) | 99.0 | 99.0 | 99.0 | 99.0 | 99.0 |
| DVB (parts) | | | | | |
| MMA (parts) | | | | | |
| AA (parts) | 1.0 | 1.0 | 1.0 | 1.0 | 1.0 |
| LASNa (parts) | 1.0 | 1.0 | 1.0 | 1.0 | 1.0 |
| PBO (parts) | 4.0 | 4.0 | | 4.0 | 4.0 |
| APS (parts) | | | 1.0 | | |

TABLE 2-continued

[Configuration of non-conductive particles and polymer in Example 7 to Example 11]

| | Ex. 7 | Ex. 8 | Ex. 9 | Ex. 10 | Ex. 11 |
|---|---|---|---|---|---|
| (Meth)acrylate ratio (%) | 98.8 | 99.0 | 98.8 | 98.8 | 98.8 |
| Number average particle diameter (nm) | 150 | 2200 | 650 | 650 | 650 |
| NMP replacement step | Yes | Yes | Yes | Yes | Yes |
| Porous membrane polymer | B1 | B1 | B1 | B1 | B1 |
| EA (parts) | 80.0 | 80.0 | 80.0 | 80.0 | 80.0 |
| AN (parts) | 15.0 | 15.0 | 15.0 | 15.0 | 15.0 |
| AGE (parts) | 5.0 | 5.0 | 5.0 | 5.0 | 5.0 |
| GMA (parts) | | | | | |
| AMPS (parts) | | | | | |
| AA (parts) | | | | | |
| KPS (parts) | 1.0 | 1.0 | 1.0 | 1.0 | 1.0 |
| VA-080 (parts) | | | | | |
| LASNa (parts) | 0.5 | 0.5 | 0.5 | 0.5 | 0.5 |
| NMP replacement step | Yes | Yes | Yes | Yes | Yes |
| Negative electrode polymer | SBR | SBR | SBR | SBR | SBR |
| ST (parts) | 63.5 | 63.5 | 63.5 | 63.5 | 63.5 |
| BD (parts) | 33.0 | 33.0 | 33.0 | 33.0 | 33.0 |
| IA (parts) | 3.5 | 3.5 | 3.5 | 3.5 | 3.5 |
| KPS (parts) | 0.5 | 0.5 | 0.5 | 0.5 | 0.5 |
| LASNa (parts) | 4.0 | 4.0 | 4.0 | 4.0 | 4.0 |

TABLE 3

[Configuration of non-conductive particles and polymer in Example 12 to Example 15]

| | Ex. 12 | Ex. 13 | Ex. 14 | Ex. 15 |
|---|---|---|---|---|
| Seed particle | S1 | S1 | S1 | S1 |
| BA (parts) | 98 | 98 | 98 | 98 |
| MAA (parts) | 2 | 2 | 2 | 2 |
| SDS (parts) | 0.16 | 0.16 | 0.16 | 0.16 |
| APS (parts) | 0.2 | 0.2 | 0.2 | 0.2 |
| (Meth)acrylate ratio (%) | 98 | 98 | 98 | 98 |
| Number average particle diameter (nm) | 360 | 360 | 360 | 360 |
| Non-conductive particle | P12 | P13 | P1 | P15 |
| Seed particle (parts) | 20.0 | 20.0 | 20.0 | 20.0 |
| EGDMA (parts) | 49.0 | 99.0 | 99.0 | 69.0 |
| DVB (parts) | | | | |
| MMA (parts) | 50.0 | | | 30.0 |
| AA (parts) | 1.0 | | 1.0 | 1.0 |
| LASNa (parts) | 1.0 | 1.0 | 1.0 | 1.0 |
| PBO (parts) | 4.0 | | 4.0 | 4.0 |
| APS (parts) | | 0.5 | | |
| (Meth)acrylate ratio (%) | 98.8 | 98.8 | 98.8 | 98.8 |
| Number average particle diameter (nm) | 646 | 632 | 650 | 630 |
| NMP replacement step | Yes | Yes | Yes | Yes |
| Porous membrane polymer | B1 | B1 | B1 | B1 |
| EA (parts) | 80.0 | 80.0 | 80.0 | 80.0 |
| AN (parts) | 15.0 | 15.0 | 15.0 | 15.0 |
| AGE (parts) | 5.0 | 5.0 | 5.0 | 5.0 |
| GMA (parts) | | | | |
| AMPS (parts) | | | | |
| AA (parts) | | | | |
| KPS (parts) | 1.0 | 1.0 | 1.0 | 1.0 |
| VA-080 (parts) | | | | |
| LASNa (parts) | 0.5 | 0.5 | 0.5 | 0.5 |
| NMP replacement step | Yes | Yes | Yes | Yes |
| Negative electrode polymer | SBR | SBR | SBR | SBR |
| ST (parts) | 63.5 | 63.5 | 63.5 | 63.5 |
| BD (parts) | 33.0 | 33.0 | 33.0 | 33.0 |
| IA (parts) | 3.5 | 3.5 | 3.5 | 3.5 |
| KPS (parts) | 0.5 | 0.5 | 0.5 | 0.5 |
| LASNa (parts) | 4.0 | 4.0 | 4.0 | 4.0 |

TABLE 4

[Configuration of non-conductive particles and polymer in Comparative Example 1 to Comparative Example 5]

| | Comp. Ex. 1 | Comp. Ex. 2 | Comp. Ex. 3 | Comp. Ex. 4 | Comp. Ex. 5 |
|---|---|---|---|---|---|
| Seed particle | S1 | S1 | | S1 | S1 |
| BA (parts) | 98 | 98 | | 98 | 98 |
| MAA (parts) | 2 | 2 | | 2 | 2 |
| SDS (parts) | 0.16 | 0.16 | | 0.16 | 0.16 |
| APS (parts) | 0.2 | 0.2 | | 0.2 | 0.2 |
| (Meth)acrylate ratio (%) | 98 | 98 | | 98 | 98 |
| Number average particle diameter (nm) | 360 | 360 | | 360 | 360 |
| Non-conductive particle | P1 | Pc2 | Alumina | Pc4 | P1 |
| Seed particle (parts) | 20.0 | 20.0 | | 20.0 | 20.0 |
| EGDMA (parts) | 99.0 | 29.0 | | | 99.0 |
| DVB (parts) | | 70.0 | | | |
| MMA (parts) | | | | 99.0 | |
| AA (parts) | 1.0 | 1.0 | | 1.0 | 1.0 |
| LASNa (parts) | 1.0 | 1.0 | | 1.0 | 1.0 |
| PBO (parts) | 4.0 | 4.0 | | 4.0 | 4.0 |
| APS (parts) | | | | | |
| (Meth)acrylate ratio (%) | 98.8 | 40.5 | | 98.8 | 98.8 |
| Number average particle diameter (nm) | 650 | 650 | 550 | 650 | 650 |
| NMP replacement step | No | Yes | Yes | Yes | Yes |
| Porous membrane polymer | B1 | B1 | B1 | B1 | Bc5 |
| EA (parts) | 80.0 | 80.0 | 80.0 | 80.0 | 85.0 |
| AN (parts) | 15.0 | 15.0 | 15.0 | 15.0 | 15.0 |
| AGE (parts) | 5.0 | 5.0 | 5.0 | 5.0 | |
| GMA (parts) | | | | | |
| AMPS (parts) | | | | | |
| AA (parts) | | | | | |
| KPS (parts) | 1.0 | 1.0 | 1.0 | 1.0 | 1.0 |
| VA-080 (parts) | | | | | |
| LASNa (parts) | 0.5 | 0.5 | 0.5 | 0.5 | 0.5 |
| NMP replacement step | No | Yes | Yes | Yes | Yes |
| Negative electrode polymer | PVDF | SBR | SBR | SBR | SBR |
| ST (parts) | | 63.5 | 63.5 | 63.5 | 63.5 |
| BD (parts) | | 33.0 | 33.0 | 33.0 | 33.0 |
| IA (parts) | | 3.5 | 3.5 | 3.5 | 3.5 |
| KPS (parts) | | 0.5 | 0.5 | 0.5 | 0.5 |
| LASNa (parts) | | 4.0 | 4.0 | 4.0 | 4.0 |

[Evaluation Results]

The evaluation results in Examples and Comparative Examples are shown in the following Tables 4 to 7.

In the following Tables 4 to 7, the row labeled "Amounts of negative electrode active materials" indicates the mixing ratio of negative electrode active materials shown in the row labeled "types of negative electrode active materials". The row labeled "Softening starting point or decomposition point" indicates one of the softening starting point and the decomposition point that was observed at a lower temperature.

TABLE 5

[Results of Example 1 to Example 5]

|  | Ex. 1 | Ex. 2 | Ex. 3 | Ex. 4 |
|---|---|---|---|---|
| Form of negative electrode polymer | Particle | Particle | Particle | Particle |
| Type of negative electrode active material | C/SiO$x$ | C/SiO$x$ | C/SiO$x$ | C/SiO$x$ |
| Amounts of negative electrode active materials | 70/30 | 70/30 | 70/30 | 70/30 |
| Non-conductive particle | | | | |
| Softening starting point or decomposition point | Decompositon point 270° C. | Decompositon point 270° C. | Decompositon point 270° C. | Decompositon point 270° C. |
| (Meth)acrylate ratio | 99% | 74% | 53% | 99% |
| Number average particle diameter | 650 nm | 650 nm | 650 nm | 650 nm |
| Particle diameter variation coefficient | 15% | 15% | 15% | 15% |
| Porous membrane polymer | | | | |
| Shape | Non-particle | Non-particle | Non-particle | Non-particle |
| Structure | Cross-linked | Cross-linked | Cross-linked | Cross-linked |
| Cross-linkable group | Epoxy group Sulfo group | Epoxy group Sulfo group | Epoxy group Sulfo group | Epoxy group Sulfo group |
| Cross-linking temperature | 180° C. | 180° C. | 180° C. | 180° C. |
| Solvent for porous membrane slurry | | | | |
| Number of solvent types | 2 types | 2 types | 2 types | 2 types |
| Boiling point difference of solvents | 124° C. | 124° C. | 124° C. | 124° C. |
| Solvent type | NMP (202° C.) EtOH (78.4° C.) | NMP (202° C.) EtOH (78.4° C.) | NMP (202° C.) EtOH (78.4° C.) | NMP (202° C.) EtOH (78.4° C.) |
| Rate property | A | A | A | A |
| Cycle property | A | B | C | A |
| Reliability test | Good | Good | Good | Good |

TABLE 6

[Results of Example 5 to Example 8]

|  | Ex. 5 | Ex. 6 | Ex. 7 | Ex. 8 |
|---|---|---|---|---|
| Form of negative electrode polymer | Particle | Particle | Particle | Particle |
| Type of negative electrode active material | C/SiO$x$ | C/SiO$x$ | C/SiO$x$ | C/SiO$x$ |
| Amounts of negative electrode active materials | 70/30 | 70/30 | 70/30 | 70/30 |
| Non-conductive particle | | | | |
| Softening starting point or decomposition point | Decompositon point 270° C. | Decompositon point 270° C. | Decompositon point 270° C. | Decompositon point 270° C. |
| (Meth)acrylate ratio | 99% | 99% | 99% | 99% |
| Number average particle diameter | 650 nm | 650 nm | 150 nm | 2200 nm |
| Particle diameter variation coefficient | 15% | 15% | 15% | 15% |

TABLE 6-continued

[Results of Example 5 to Example 8]

| | Ex. 5 | Ex. 6 | Ex. 7 | Ex. 8 |
|---|---|---|---|---|
| Porous membrane polymer | | | | |
| Shape | Non-particle | Non-particle | Non-particle | Non-particle |
| Structure | Cross-linked | Cross-linked | Cross-linked | Cross-linked |
| Cross-linkable group | Epoxy group Sulfo group | Epoxy group Carboxyl group | Epoxy group Sulfo group | Epoxy group Sulfo group |
| Cross-linking temperature | 180° C. | 180° C. | 180° C. | 180° C. |
| Solvent for porous membrane slurry | | | | |
| Number of solvent types | 2 types | 2 types | 2 types | 2 types |
| Boiling point difference of solvents | 124° C. | 124° C. | 124° C. | 124° C. |
| Solvent type | NMP (202° C.) EtOH (78.4° C.) | NMP (202° C.) EtOH (78.4° C.) | NMP (202° C.) EtOH (78.4° C.) | NMP (202° C.) EtOH (78.4° C.) |
| Rate property | A | A | C | A |
| Cycle property | A | C | A | C |
| Reliability test | Good | Good | Good | Good |

TABLE 7

Results of Example 9 to Example 11

| | Ex. 9 | Ex. 10 | Ex. 11 |
|---|---|---|---|
| Form of negative electrode polymer | Particle | Particle | Particle |
| Type of negative electrode active material | C/SiOx | C/SiOC | C/SiC |
| Amounts of negative electrode active materials | 70/30 | 70/30 | 70/30 |
| Non-conductive particle | | | |
| Softening starting point or decomposition point | Decompositon point 270° C. | Decompositon point 270° C. | Decompositon point 270° C. |
| (Meth)acrylate ratio | 99% | 99% | 99% |
| Number average particle diameter | 650 nm | 650 nm | 650 nm |
| Particle diameter variation coefficient | 30% | 15% | 15% |
| Porous membrane polymer | | | |
| Shape | Non-particle | Non-particle | Non-particle |
| Structure | Cross-linked | Cross-linked | Cross-linked |
| Cross-linkable group | Epoxy group Sulfo group | Epoxy group Sulfo group | Epoxy group Sulfo group |
| Cross-linking temperature | 180° C. | 180° C. | 180° C. |
| Solvent for porous membrane slurry | | | |
| Number of solvent types | 2 types | 2 types | 2 types |
| Boiling point difference of solvents | 124° C. | 124° C. | 124° C. |

TABLE 7-continued

Results of Example 9 to Example 11

|  | Ex. 9 | Ex. 10 | Ex. 11 |
|---|---|---|---|
| Solvent type | NMP (202° C.) EtOH (78.4° C.) | NMP (202° C.) EtOH (78.4° C.) | NMP (202° C.) EtOH (78.4° C.) |
| Rate property | C | A | A |
| Cycle property | A | A | A |
| Reliability test | Good | Good | Good |

TABLE 8

[Results of Example 12 to Example 15]

|  | Ex. 12 | Ex. 13 | Ex. 14 | Ex. 15 |
|---|---|---|---|---|
| Form of negative electrode polymer | Particle | Particle | Particle | Particle |
| Type of negative electrode active material | C/SiOx | C/SiOx | C/SiOx | C/SiOx |
| Amounts of negative electrode active materials | 70/30 | 70/30 | 70/30 | 70/30 |
| Non-conductive particle |  |  |  |  |
| Softening starting point or decomposition point | Softening starting point 190° C. | Decompositon point 270° C. | Decompositon point 270° C. | Softening starting point 230° C. |
| (Meth)acrylate ratio | 99% | 99% | 99% | 99% |
| Number average particle diameter | 646 nm | 632 nm | 650 nm | 630 nm |
| Particle diameter variation coefficient | 17% | 25% | 15% | 18% |
| Porous membrane polymer |  |  |  |  |
| Shape | Non-particle | Non-particle | Non-particle | Non-particle |
| Structure | Cross-linked | Cross-linked | Cross-linked | Cross-linked |
| Cross-linkable group | Epoxy group Sulfo group | Epoxy group Sulfo group | Epoxy group Sulfo group | Epoxy group Sulfo group |
| Cross-linking temperature | 180° C. | 180° C. | 180° C. | 180° C. |
| Solvent for porous membrane slurry |  |  |  |  |
| Number of solvent types | 2 types | 2 types | 2 types | 2 types |
| Boiling point difference of solvents | 124° C. | 124° C. | 46° C. | 124° C. |
| Solvent type | NMP (202° C.) EtOH (78.4° C.) | NMP (202° C.) EtOH (78.4° C.) | NMP (202° C.) Cyclohexanone (155.6° C.) | NMP (202° C.) EtOH (78.4° C.) |
| Rate property | C | B | C | A |
| Cycle property | C | A | A | A |
| Reliability test | Good | Good | Good | Good |

TABLE 9

[Results of Comparative Example 1 to Comparative Example 5]

|  | Comp. Ex. 1 | Comp. Ex. 2 | Comp. Ex. 3 | Comp. Ex. 4 | Comp. Ex. 5 |
|---|---|---|---|---|---|
| Form of negative electrode polymer | Non-particle | Particle | Particle | Particle | Particle |

TABLE 9-continued

[Results of Comparative Example 1 to Comparative Example 5]

| | Comp. Ex. 1 | Comp. Ex. 2 | Comp. Ex. 3 | Comp. Ex. 4 | Comp. Ex. 5 |
|---|---|---|---|---|---|
| Type of negative electrode active material | C/SiOx | C/SiOx | C/SiOx | C/SiOx | C/SiOx |
| Amounts of negative electrode active materials | 70/30 | 70/30 | 70/30 | 70/30 | 70/30 |
| Non-conductive particle | | | | | |
| Softening starting point or decomposition point | Decompositon point 270° C. | Decompositon point 270° C. | Decompositon point 500° C.< | Softening starting point 130° C. | Decompositon point 270° C. |
| (Meth)acrylate ratio | 99% | 41% | Alumina | 99% | 99% |
| Number average particle diameter | 650 nm | 650 nm | 650 nm | 650 nm | 650 nm |
| Particle diameter variation coefficient | 15% | 15% | 15% | 15% | 15% |
| Porous membrane polymer | | | | | |
| Shape | Particle | Non-particle | Non-particle | Non-particle | Non-particle |
| Structure | Cross-linked | Cross-linked | Cross-linked | Cross-linked | Non cross-linked |
| Cross-linkable group | Epoxy group Sulfo group | Epoxy group Sulfo group | Epoxy group Sulfo group | Epoxy group Sulfo group | Sulfo group |
| Cross-linking temperature | 180° C. | 180° C. | 180° C. | 180° C. | 180° C. |
| Solvent for porous membrane slurry | | | | | |
| Number of solvent types | 2 types | 2 types | 2 types | 2 types | 2 types |
| Boiling point difference of solvents | 124° C. | 124° C. | 124° C. | 124° C. | 124° C. |
| Solvent type | NMP (202° C.) EtOH (78.4° C.) | NMP (202° C.) EtOH (78.4° C.) | NMP (202° C.) EtOH (78.4° C.) | NMP (202° C.) EtOH (78.4° C.) | NMP (202° C.) EtOH (78.4° C.) |
| Rate property | D | A | C | D | A |
| Cycle property | D | D | D | D | D |
| Reliability test | Bad | Bad | Bad | Bad | Bad |

[Discussion]

As can be seen from the results in Examples and Comparative Examples, according to the present invention, a highly reliable secondary battery having excellent cycle property can be realized.

Now Examples will be compared with Comparative Example 1. In each Example, the results for all the rate property, cycle property, and reliability were better than those in Comparative Example 1. In Comparative Example 1, a non-particulate polymer was used as the negative electrode polymer. That is considered to be the reason for high resistance of the negative electrode and low rate property. In Comparative Example 1, a particulate polymer was uses as the porous membrane polymer. That is considered to be the reason for decrease in binding property of the porous membrane polymer, and poor results in reliability and cycle property. Therefore, it was confirmed that the shape of the negative electrode polymer and the shape of the porous membrane polymer are significant for improving the rate property, cycle property, and reliability of the secondary battery.

Then Examples will be compared with Comparative Example 2. In each Example, the results for the cycle property and reliability were better than those in Comparative Example 2. In Comparative Example 2, the ratio of the (meth)acrylate unit in the polymer forming the non-conductive particles was low. That is considered to be the reason for low compatibility with the porous membrane polymer, and poor strength of the porous membrane. That is in turn considered to be the reason for low durability against expansion and contraction of the negative electrode active material and poor cycle property. It is also considered that the low compatibility between the non-conductive particles and the porous membrane polymer is the reason for low binding property and high tendency to cause detachment of the non-conductive particles from the porous membrane, which in turn causes short circuit. Therefore, it was confirmed that the ratio of the (meth)acrylate unit in the polymer forming the non-conductive particles is significant for improving the cycle property and reliability of the secondary battery.

Then Examples will be compared with Comparative Example 3. In Comparative Example 3, as in Comparative Example 2, the cycle property and the reliability were poor. That is considered to be because of low compatibility between the non-conductive particles and the porous membrane polymer.

Then Examples will be compared with Comparative Example 4. In each Example, the results for all the rate property, cycle property, and reliability were better than those in Comparative Example 4. In Comparative Example 4, the softening starting point or decomposition point of the non-conductive particles was low. That is considered to be the reason for high tendency for decomposition of the non-conductive particles when the porous membrane polymer is cross-linked, which in turn causes deterioration of the porous membrane. Therefore, it was confirmed that the softening starting point and decomposition point of the polymer forming the non-conductive particles are significant for improving the rate property, cycle property, and reliability of the secondary battery.

Then Examples will be compared with Comparative Example 5. In each Example, the results for the cycle property and reliability were better than those in Comparative Example 5. In Comparative Example 5, since the porous membrane polymer was not cross-linked, the effect of improving the binding property and membrane strength by cross-linking was not obtained. That is considered to be the reason for poor results in cycle property and reliability. Therefore, it was confirmed that cross-linking of the porous membrane polymer is significant for improving the cycle property and reliability of the secondary battery.

The invention claimed is:

1. A secondary battery negative electrode comprising a current collector, a negative electrode active material layer, and a porous membrane, wherein
   the negative electrode active material layer contains a negative electrode active material and a particulate negative electrode polymer,
   the porous membrane contains non-conductive particles and a porous membrane polymer that is a non-particulate cross-linked polymer, and
   the non-conductive particles are particles of a polymer that contains 98.8% by weight or more and 100% by weight or less of a structural unit formed by polymerization of a (meth)acrylate, the polymer having a softening starting point or decomposition point of 175° C. or higher.

2. The secondary battery negative electrode according to claim 1, wherein the porous membrane polymer includes a cross-linked structure formed by one or more types of groups selected from the group consisting of an epoxy group, a carboxyl group, and a sulfo group.

3. The secondary battery negative electrode according to claim 1, wherein
   a number average particle diameter of the non-conductive particles is 100 nm to 2,000 nm, and
   a variation coefficient in diameter of the non-conductive particles is 26% or less.

4. The secondary battery negative electrode according to claim 1, wherein the negative electrode active material is a composite particle containing a material including silicon.

5. The secondary battery negative electrode according to claim 1 wherein the negative electrode active material contains a combination of carbon and one or both of metallic silicon and a silicon-based active material.

6. The secondary battery negative electrode according to claim 1 wherein the porous membrane polymer contains a structural unit formed by polymerization of a (meth)acrylic acid ester.

7. The secondary battery negative electrode according to claim 1 wherein an amount of the porous membrane polymer in the porous membrane based on 100 parts by weight of the non-conductive particles is 2 parts by weight or more and 37 parts by weight or less.

8. A secondary battery comprising a positive electrode, a negative electrode, an electrolytic solution, and a separator, wherein the negative electrode is the secondary battery negative electrode according to claim 1.

9. A method for producing a secondary battery negative electrode including a current collector, a negative electrode active material layer, and a porous membrane, the method comprising:
   applying a negative electrode slurry containing a negative electrode active material, a particulate negative electrode polymer, and water onto the current collector and then drying the negative electrode slurry to thereby obtain the negative electrode active material layer;
   applying a porous membrane slurry onto the negative electrode active material layer and drying the applied porous membrane slurry, the porous membrane slurry containing: non-conductive particles that are particles of a polymer that includes 98.8% by weight or more and 100% by weight or less of a structural unit formed by polymerization of a (meth)acrylate and has a softening starting point or decomposition point of 175° C. or higher; a porous membrane polymer that is a non-particulate cross-linkable polymer; and a solvent; and
   cross-linking the porous membrane polymer by heating.

10. The method for producing a secondary battery negative electrode according to claim 9, wherein
   the porous membrane slurry contains two or more types of solvents, and
   the difference in boiling point between the two or more types of solvents is 40° C. or more.

* * * * *